US012691709B2

(12) United States Patent　(10) Patent No.: US 12,691,709 B2
Miazzo et al.　(45) Date of Patent: Jul. 28, 2026

(54) SELF-SUPPORTING TYRE FOR AUTOMOTIVE WHEELS

(71) Applicant: Pirelli Tyre S.p.A., Milan (IT)

(72) Inventors: Davide Miazzo, Milan (IT); Emiliano Resmini, Milan (IT); Luca Camosi, Milan (IT); Luca Giannini, Milan (IT); Dario Scaltritti, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 0 days.

(21) Appl. No.: 18/258,002

(22) PCT Filed: Dec. 22, 2021

(86) PCT No.: PCT/IB2021/062192

§ 371 (c)(1),
(2) Date: Jun. 16, 2023

(87) PCT Pub. No.: WO2022/137166

PCT Pub. Date: Jun. 30, 2022

(65) Prior Publication Data

US 2024/0051351 A1　Feb. 15, 2024

(30) Foreign Application Priority Data

Dec. 23, 2020　(IT) ........................ 102020000032147
Dec. 23, 2020　(IT) ........................ 102020000032189

(51) Int. Cl.
　B60C 17/00　(2006.01)
　B60C 17/08　(2006.01)
　B60C 1/00　(2006.01)

(52) U.S. Cl.
　CPC .. B60C 17/0009 (2013.01); *B60C 2001/0033* (2013.01); *B60C 2017/0063* (2013.01)

(58) Field of Classification Search
　CPC . B60C 17/00; B60C 17/0009; B60C 17/0018; B60C 17/0027;
　(Continued)

(56) References Cited

U.S. PATENT DOCUMENTS 4,742,124 A　5/1988　Tsutsumi et al.
4,779,658 A　10/1988　Kawabata et al.
(Continued)

FOREIGN PATENT DOCUMENTS

DE　102015207453　* 10/2015
EP　0 451 604 A2　10/1991
(Continued)

OTHER PUBLICATIONS

Mechanics of Pneumatic Tires, Aug. 1981.*
(Continued)

*Primary Examiner* — Justin R Fischer
(74) *Attorney, Agent, or Firm* — Finnegan, Henderson, Farabow, Garrett & Dunner, L.L.P.

(57)　ABSTRACT

The present invention relates to a self-supporting tyre (100) for motor vehicles which comprises sidewall reinforcing inserts (113A, 113B) with different stiffness. In particular, the sidewall reinforcing insert on the side of the tyre most stressed during driving is less rigid than the sidewall reinforcing insert on the less stressed side. The tyre of the invention exhibits a reduced rolling resistance and better comfort in normal driving and an unexpected increase in mileage in run-flat driving.

19 Claims, 1 Drawing Sheet

(58) Field of Classification Search
CPC .... B60C 2017/0054; B60C 2017/0063; B60C
2017/0072; B60C 1/0008; B60C
2001/0033; B60C 17/0036; B60C
17/0045; B60C 217/0054; B60C
217/0063; B60C 217/0072
See application file for complete search history.

(56)                    References Cited

U.S. PATENT DOCUMENTS

| | | | |
|---|---|---|---|
| 6,182,728 B1 | 2/2001 | Williams et al. | |
| 6,422,279 B1 | 7/2002 | Williams et al. | |
| 6,561,245 B1 | 5/2003 | Close et al. | |
| 2007/0012391 A1 | 1/2007 | Willard, Jr. | |
| 2007/0131330 A1 | 6/2007 | Yamashita | |
| 2012/0145299 A1* | 6/2012 | Hino ........................ | B60C 13/02 |
| | | | 152/516 |
| 2013/0075003 A1 | 3/2013 | Horiuchi | |
| 2014/0173900 A1 | 6/2014 | Tanaka | |
| 2019/0270866 A1 | 9/2019 | Tadiello et al. | |

FOREIGN PATENT DOCUMENTS

| | | | | | |
|---|---|---|---|---|---|
| EP | 0590482 B1 * | 12/1997 | | | |
| EP | 1 057 663 A1 | 12/2000 | | | |
| EP | 1160101 A2 | 12/2001 | | | |
| EP | 1160101 A3 | 7/2003 | | | |
| EP | 1676730 A1 * | 7/2006 | ......... | B60C 17/0009 | |
| EP | 1733901 A1 * | 12/2006 | ......... | B60C 15/0018 | |
| EP | 2 231 422 B1 | 9/2010 | | | |
| EP | 2 408 626 B1 | 5/2013 | | | |
| EP | 2 735 455 A1 | 5/2014 | | | |
| EP | 2 271 682 B1 | 4/2016 | | | |
| EP | 2 283 046 B1 | 10/2016 | | | |
| EP | 2 895 515 B1 | 8/2017 | | | |
| EP | 3 049 447 B1 | 6/2018 | | | |
| JP | 3703922 B2 | 10/2005 | | | |
| JP | 2010-162825 * | 7/2010 | | | |
| WO | WO 2005/072992 A1 | 8/2005 | | | |
| WO | WO 2015/086039 A1 | 6/2015 | | | |
| WO | WO 2016/050887 A1 | 4/2016 | | | |
| WO | WO 2016/174628 A1 | 11/2016 | | | |
| WO | WO 2016/174629 A1 | 11/2016 | | | |
| WO | WO 2017/211876 A1 | 12/2017 | | | |
| WO | WO 2018/078480 A1 | 5/2018 | | | |
| WO | 2018122688 A1 | 7/2018 | | | |
| WO | WO 2019/086785 A1 | 5/2019 | | | |
| WO | WO 2019/106562 A1 | 6/2019 | | | |

OTHER PUBLICATIONS

International Search Report form the European Patent Office in corresponding International Application No. PCT/IB2021/062192 mailed Apr. 25, 2022.

Written Opinion of the International Searching Authority from the European Patent Office in corresponding International Application No. PCT/IB2021/062192 mailed Apr. 25, 2022.

Office Action issued by the European Patent Office on Apr. 17, 2025, in corresponding European Application No. EP 21844063.4.

Notification of the First Office Action issued by the State Intellectual Property Office on Mar. 17, 2026, in corresponding Application No. CN 202180091030.6 (7 pages).

Zhang, Y. et al., "Effect of Carcass Skeleton Material on Performance of Passenger Car Radial Tire", China Academic Journal Electronic Publishing House, 2020, (6 pages).

* cited by examiner

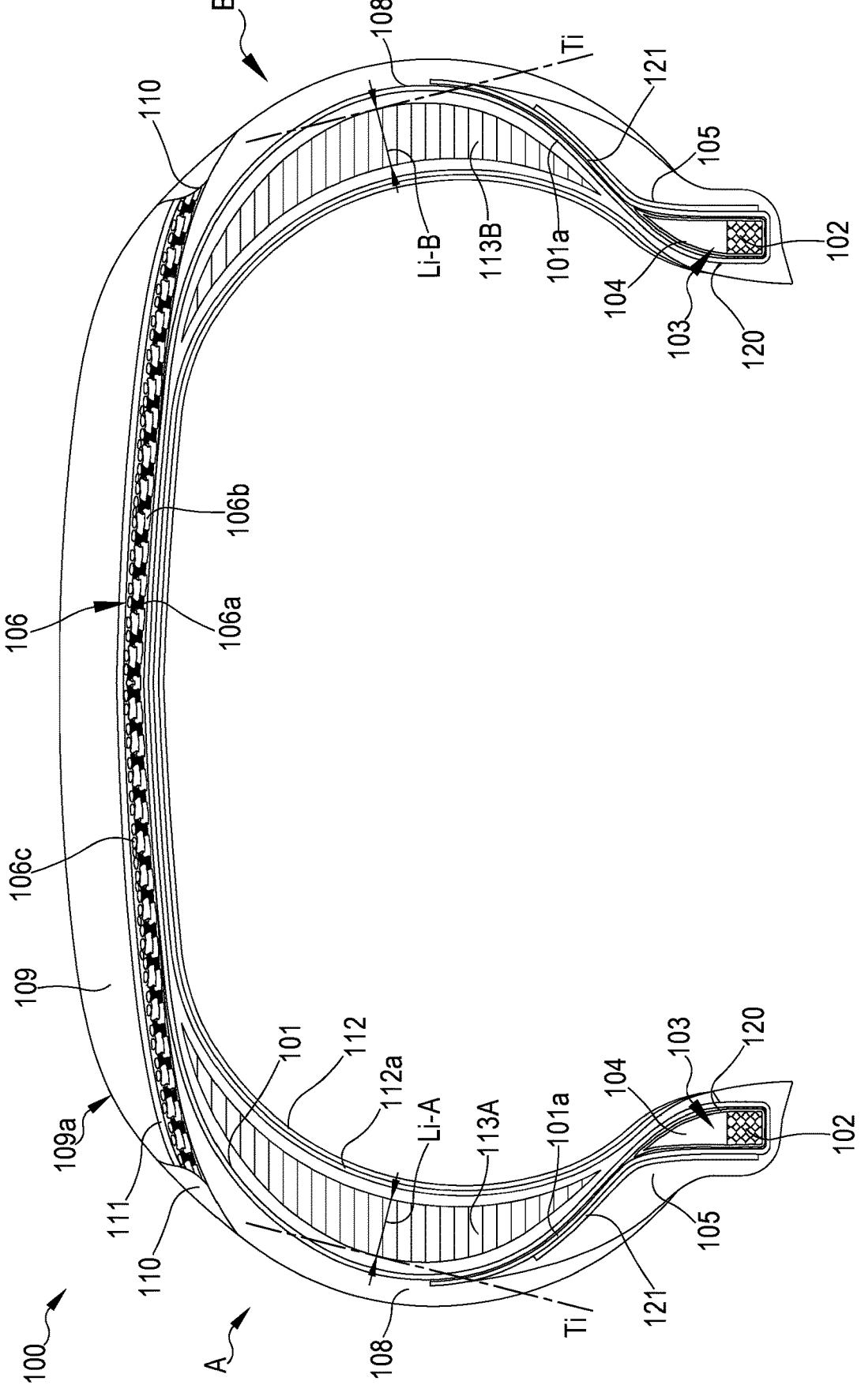

SELF-SUPPORTING TYRE FOR AUTOMOTIVE WHEELS

This application is a national stage entry application under 35 U.S.C. § 371 of International Application No. PCT/ IB2021/062192, filed on Dec. 22, 2021, and claims priority to Italian Application No. 102020000032147, filed Dec. 23, 2020, and Italian Application No. 102020000032189, filed Dec. 23, 2020; the contents of each application is incorporated herein by reference in its entirety.

FIELD OF THE INVENTION

The present invention relates to a self-supporting tyre for vehicle wheels.

In recent years, tyre manufacturers have sought to eliminate the need for a bulky spare wheel in the vehicle, while ensuring the ability for the vehicle to continue its trip despite a significant or total pressure loss of one or more tyres.

The spare wheel is now typically replaced by a reduced section wheel or by a repair/inflating kit which, however, require stopping and carrying out operations in often critical conditions.

Self-supporting tyres are tyres capable of supporting the vehicle load under a considerable or total loss of pressure, allowing the driver to travel, for a certain distance, to reach a garage without having to stop waiting for roadside assistance or to replace/re-inflate the tyre in a potentially dangerous situation.

When the inflation pressure is significantly lower than the operating pressure, or even zero (this is called "run-flat" mode), the tyre must be capable of travelling a certain distance at a certain speed, for example 80 km to 80 km/h.

This performance, known as "EM" (Extended Mobility) performance, is required by legislation or by vehicle manufacturers to enable the manufacturer to present the tyre as suitable for run-flat.

When the inflation pressure is close to the operating pressure (in this case one speaks of "normal driving" mode), it is desirable that the tyre has the highest possible performance, such as, inter alia, manoeuvrability, low weight, low rolling resistance and adequate comfort.

Ideally, the structure of a self-supporting tyre should have sufficient strength to prevent the sidewall structures and the internal surfaces from collapsing or folding back on themselves when the tyre is used in a deflated condition and, on the other hand, when the tyre is in normal inflation operating conditions, it should exhibit favourable qualities of comfort and rolling resistance.

Several techniques have been used to achieve the above support effect without compromising normal running conditions.

Thus, for example, to impart self-supporting features to the tyre, i.e. the aforementioned ability to guarantee travel for short/medium distances at reduced or substantially zero inflation pressure, for example following a puncture, it is known to integrate into the sidewall structure of the tyre one or more sidewall reinforcing inserts of elastomeric material, generally having a lenticular and/or substantially semi-circular profile, in an axially external position to the layer of air-impermeable elastomeric material and axially internal to each of the sidewalls. These sidewall reinforcing inserts of elastomeric material have the purpose of adequately supporting the vehicle load when the normal inflation pressure of the tyre is reduced, for example following a puncture.

A self-supporting tyre for vehicle wheels so configured therefore comprises:

a carcass structure comprising at least one carcass layer having opposite lateral edges associated with respective annular anchoring structures;

a belt structure applied in a position radially external to the carcass structure;

a tread band applied in a position radially external to the belt structure;

a pair of sidewall structures each including a sidewall extended in a position axially external to the carcass structure and extended radially between one of the annular anchor structures and an axially external portion of the tread band;

a layer of air-impermeable elastomeric material, called liner, applied in a radially internal position to the carcass structure; and at least one pair of sidewall reinforcing inserts, each incorporated in the respective sidewall structure of the tyre in a position axially external to the layer of air-impermeable elastomeric material and axially internal to each of the sidewalls.

Typically in passenger cars, the wheels are mounted with a certain camber angle to allow the tyres to have the maximum contact surface with the road, especially when cornering, in order to have optimal grip. Camber is positive when the top of the wheels tends towards the outside of the vehicle, while it is negative if the top of the wheel is tilted towards the inside of the vehicle. It is known that the grip of the tyres increases as the contact surface with the road increases, therefore, the ideal situation would be that of a wheel constantly perpendicular to the road surface with tyres that do not deform due to the high lateral loads. However, in reality one must take into account the deformations of the tyre and the excursions of the suspensions subjected to load transfers during the ride.

On modern cars, the camber is almost always negative or zero to favour road grip when cornering. In particular, on the front axle it is 0° or slightly negative (1°-1.5°) in order to minimize irregular tyre wear. On the other hand, a more pronounced negative camber is preferable to the rear, both to obtain maximum grip when the car is leaning when cornering, and to improve cornering and reduce understeer behaviour.

In the case of negative camber tyres, tyre failure occurs essentially on the side of the tyre facing towards the inside of the vehicle.

Therefore, self-supporting tyres installed on the rear wheels of the vehicle are even more prone to a large load and damage inside the tyre in run-flat condition.

PRIOR ART

In the field of self-supporting tyres, various embodiments have been proposed, aimed at imparting the required features of self-supporting capacity, without excessively penalizing the ride comfort and consumption at normal inflation pressure.

According to an approach suggested by the prior art, the self-supporting capacity is ensured by reinforcing the sidewall structures with at least one insert of a specific rubber, in a position axially external to the liner and axially internal to each of the sidewalls.

Typically, the sidewall reinforcing insert works by supporting the flat tyre. According to the prior art, it is believed that the insert should be made of a material with a high modulus, to ensure lift, low hysteresis to minimise rolling resistance and good elongation at break, mainly to allow mounting/dismounting of the tyre on the rim.

However, when driving under normal inflation conditions, the presence of sidewall reinforcing inserts with high moduli imposes strong stresses and an undesirable reduction in ride comfort.

Usually, to improve the lift performance of the self-supporting tyre, side reinforcing inserts are used, even of large volume, which, however, worsen the ride comfort and fuel consumption due to their greater mass.

Generally, in order to identify the best compromise, the reinforcing inserts are made with a high modulus compound, not ideal due to the high rolling resistance and poor comfort, and the thickness is gradually reduced until the minimum value that guarantees the required run-flat distance is identified. However, the final performances are not entirely satisfactory due to the still high rolling resistance values and the limited run-flat performance.

In fact, the prior art teaches to impart a high modulus to the elastomeric compounds of the reinforcing inserts in different ways, for example by charging them with large amounts of reinforcing materials and/or by comprising elastomers with high modulus and/or by reinforcing them by increasing the cross-linking density, using large amounts of vulcanising agents or additional cross-linking systems.

Moreover, in order to take into account the asymmetry of the stresses to which the tyre is subjected during driving, especially in the case of high negative camber, different solutions have been proposed in the prior art in which the performance of the two sidewall reinforcing inserts typically differ with the aim of reinforcing the sidewall that is most stressed—for example by using more rigid materials and/or by increasing the thickness of the reinforcing insert or the insert and the relevant sidewall, always on the side that is most stressed. In the following description, the sidewall reinforcing inserts of a tyre differing in performances and elastomeric composition and/or dimensions are generally referred to as "asymmetrical" reinforcing inserts.

For example, document EP2735455A1 describes self-supporting tyres with asymmetrical inserts, in which the side reinforcing insert on one sidewall (9A) has a thickness B1 greater than the thickness B2 of the sidewall reinforcing insert on the other side (9B) while the sidewall of the first side (10 A) has a thickness A1 less than the thickness A2 of the sidewall of the other side. The document teaches that the sidewall material must have a complex elastic modulus E*1 of not less than 3 MPa (par. 31) and that the modulus E*2 of the reinforcing insert material (9) must be even higher (par. 39). The examples (Tables 1-1 and 1-2) show E*2 values of 6 or 8 MPa. The description does not disclose any elastomeric composition in detail.

Document WO2019086785A1 describes self-supporting tyres comprising sidewall reinforcing inserts made of high modulus materials, in particular with a complex shear dynamic modulus G*, at least equal to 1.0 MPa (claim 1), preferably at least equal to 1.9 MPa (claim 3) and advantageously from 1.9 to 3.3 MPa (par. 25). The tyres of the examples have reinforcing inserts made of elastomeric material having a complex modulus G* equal to 3.15 MPa.

The sidewall reinforcing inserts described herein may be asymmetrical. In fact, due to the rigidity of the material, the reinforcing insert of the internal sidewall may be reduced in thickness compared to the insert of the external side, with a consequent reduction in mass and stresses in the limit speed test. The description does not disclose any elastomeric composition in detail.

Document WO2005072992A1 describes self-supporting tyres comprising asymmetrical reinforcing inserts, wherein the inner sidewall reinforcing insert has a significantly higher modulus than that of the outer sidewall reinforcing insert, preferably a secant modulus of 5 to 13 MPa (page 4, third par. and Table 1). Preferred elastomeric compositions of the reinforcing insert have a high content of polybutadiene (50 to 80 phr, page 4, penultimate par.). The composition for the sidewall insert shown herein (page 16) has a filler content (carbon black) of 65 phr. Document JP3703922B2 describes asymmetrical self-supporting tyres, having the sidewall reinforcing insert of the side that is more stressed—in this case the external one, just where the load and, consequently, the damage tend to be concentrated being self-supporting tyres installed on the front wheels—than the internal one. The description does not show any elastomeric composition in detail nor does it mention modulus values of the materials.

In conclusion, it appears consolidated in the prior art that in this type of tyres it is necessary to have rigid sidewall reinforcing inserts in order to ensure sufficient self-supporting capacity and typically more rigid and/or thicker on the most stressed side of the tyre.

SUMMARY OF THE INVENTION

In light of the prior art, the Applicant has undertaken studies to improve the performance of self-supporting tyres, in particular to further reduce rolling resistance, and therefore fuel consumption, while improving comfort and performance in run-flat conditions.

The Applicant has found that it is possible to reconcile the need to impart an even more reduced rolling resistance and comfort to the tyre, ensuring the desired self-supporting features well beyond the minimum mileage required by the car manufacturers.

This result was obtained, surprisingly and contrary to what is taught by the prior art, by reducing the stiffness of a sidewall reinforcing insert, more particularly of the sidewall reinforcing insert placed on the most stressed side of the tyre, with a compound having a lower modulus than that of the other reinforcing insert (located on the less stressed side of the tyre). In the present description, "side A" will preferably indicate the side of the tyre less stressed during driving and "side B" the most stressed one.

Furthermore, the Applicant has surprisingly found that if the same compound with a lower modulus is also used in a particular internal layer of the present self-supporting tyre, called underliner, the aforesaid performances further improve.

In this way it was possible to achieve an overall result of rolling resistance, comfort and, in run-flat driving conditions, of travel, which is unexpectedly improved compared to self-supporting tyres of the prior art characterised by more rigid asymmetrical inserts, where typically greater support was provided to the most stressed side of the tyre.

Therefore, the object of the present invention is a self-supporting tyre for automotive wheels comprising

- a carcass structure comprising at least one carcass layer having opposite lateral edges associated to respective annular anchoring structures;
- a belt structure applied in a position radially external to the carcass structure;
- a tread band applied in a position radially external to the belt structure;
- a pair of sidewall structures each including a sidewall extended in a position axially external to the carcass structure and extended radially between one of the annular anchoring structures and an axially external portion of the tread band;

a single first and a single second sidewall reinforcing insert, said first and second inserts being each incorporated into the respective sidewall structure of the tyre, at a position axially internal to the respective sidewall, characterised in that said first sidewall reinforcing insert consists of an elastomeric compound (A) having a shear modulus value G' of at least 1.25 MPa, and said second sidewall reinforcing insert consists of an elastomeric compound (B) having a shear modulus value G' of less than 1.25 MPa, said moduli G' being measured at 70° C., 10 Hz, 9% strain according to the method disclosed in the present description.

Preferably, said elastomeric compound (B) is prepared by mixing and vulcanising an elastomeric composition comprising at least 100 phr of at least one diene elastomeric polymer, a total amount of less than 30% by weight of the total weight of the at least one reinforcing filler composition, and at least 0.1 phr of the at least one vulcanising agent.

Preferably, said first sidewall reinforcing insert is arranged in side A of the tyre.

Preferably, said second sidewall reinforcing insert is arranged in side B of the tyre.

Definitions

In the present description and following claims, the following definitions apply.

The term "elastomeric composition" means a composition comprising at least one diene elastomeric polymer and one or more additives, which by mixing and possible heating provides an elastomeric compound suitable for use in tyres and components thereof.

The components of the elastomeric composition are not generally introduced simultaneously into the mixer but typically added in sequence. In particular, the vulcanisation additives, such as the vulcanising agent and possibly the accelerant and retardant agents, are usually added in a downstream step with respect to the incorporation and processing of all the other components.

In the final vulcanisable or even more vulcanised elastomeric compound, the individual components of the elastomeric composition may be altered or no longer individually traceable as modified, completely or in part, due to the interaction with the other components, of heat and/or mechanical processing.

The term "elastomeric compound" indicates the compound obtainable by mixing and possibly heating at least one elastomeric polymer with at least one of the additives commonly used in the preparation of tyre compounds.

The term "vulcanisable elastomeric compound" indicates the elastomeric compound ready for vulcanisation, obtainable by incorporation into an elastomeric compound of all the additives, including those of vulcanisation.

The term "vulcanised elastomeric compound" means the material obtainable by vulcanisation of a vulcanisable elastomeric compound.

The term "green" indicates a material, a compound, a composition, a component or a tyre not yet vulcanised.

The term "vulcanisation" refers to the cross-linking reaction in a natural or synthetic rubber induced by a sulphur-based and/or peroxide-based vulcanising agent.

The term "vulcanising agent" indicates a product capable of transforming natural or synthetic rubber into elastic and resistant material due to the formation of a three-dimensional network of stable inter- and intra-molecular bonds. Typically, the vulcanising agent is a sulphur-based compound such as elemental sulphur, polymeric sulphur, sulphurised agents such as bis[(trialkoxysilyl)propyl]polysulphides, thiurams, dithiodimorpholines and caprolactamdisulphide. Alternatively, the vulcanising agent is a peroxide which contains an O-O bond and may generate reactive radicals by heating.

The term "vulcanisation accelerant" means a compound capable of decreasing the duration of the vulcanisation process and/or the operating temperature, such as TBBS, sulphenamides in general, thiazoles, dithiophosphates, dithiocarbamates, guanidines, as well as sulphur donors such as thiurams.

The term "vulcanisation activating agent" indicates a product capable of further facilitating the vulcanisation, making it happen in shorter times and possibly at lower temperatures. An example of activating agent is the stearic acid-zinc oxide system.

In the case of peroxide vulcanising agents, an example of activator is given by polymethacrylates such as ethylene glycol dimethacrylate.

The term "vulcanisation retardant" indicates a product capable of delaying the onset of the vulcanisation reaction and/or suppressing undesired secondary reactions, for example N-(cyclohexylthio)phthalimide (CTP).

The term "vulcanisation package" is meant to indicate the vulcanising agent and one or more vulcanisation additives selected from among vulcanisation activating agents, accelerants and retardants.

The term "elastomeric polymer" or "elastomer" or "rubber" indicates a natural or synthetic polymer which, after vulcanisation, may be stretched repeatedly at room temperature to at least twice its original length and after removal of the tensile load substantially immediately returns with force to approximately its original length (according to the definitions of the ASTM D1566-11 Standard terminology relating to Rubber).

The term "diene elastomeric polymer" indicates an elastomeric polymer derived from the polymerization of one or more monomers, of which at least one is a conjugated diene.

The term "reinforcing filler" is meant to refer to a reinforcing material typically used in the sector to improve the mechanical properties of tyre rubbers, preferably selected from among carbon black, conventional silica, such as silica from sand precipitated with strong acids, preferably amorphous, diatomaceous earth, calcium carbonate, titanium dioxide, talc, alumina, aluminosilicates, kaolin, silicate fibres, derivatives thereof and mixtures thereof.

The term "white filler" is meant to refer to a conventional reinforcing material used in the sector selected from among conventional silica and silicates, such as sepiolite, paligorskite also known as attapulgite, montmorillonite, alloisite and the like, possibly modified by acid treatment and/or derivatised. Typically, white fillers have surface hydroxyl groups, possibly partially derivatised.

The term "mixing step (1) or first step" indicates the step of the preparation process of the elastomeric compound in which one or more additives may be incorporated by mixing and possibly heating, except for the vulcanising agent and the vulcanisation package which are fed in step (2). The mixing step (1) is also referred to as "non-productive step". In the preparation of a compound there may be several "non-productive" mixing steps which may be indicated with 1*a*, 1*b*, etc.

The term "mixing step (2) or second step" indicates the next step of the preparation process of the elastomeric compound in which the vulcanising agent and, possibly, other additives among which those of the vulcanisation package are introduced into the elastomeric compound obtained from step (1), and mixed in the material, at controlled temperature, generally at a compound temperature lower than 120° C., so as to give the vulcanisable elastomeric compound. The mixing step (2) is also referred to as "productive step". In the preparation of a compound there may be several "productive" mixing steps which may be indicated with 2a, 2b, etc.

The terms complex, elastic and viscous modulus designate dynamic properties well known to those skilled in the art.

The term "dynamic shear modulus" or "sliding modulus" G' means the ratio between the shear stress applied to a specimen of vulcanised elastomeric compound and the resulting deformation. The details of the experimental measurement method are reported in the present description.

The term "dynamic elastic compression or elongation modulus E'" means the ratio between the uniaxial compression or traction stress applied to a specimen of vulcanised elastomeric compound and the resulting deformation. The details of the experimental measurement method are reported in the present description. The term "axial extension" or "thickness" (Li, insert width) of the sidewall reinforcing insert means the extension of such elements measured perpendicular to a plane tangent to the external surface of the reinforcing insert.

The term "equatorial plane" of the tyre means a plane perpendicular to the rotation axis of the tyre and which divides the tyre into two symmetrically equal parts.

The terms "radial" and "axial" and the expressions "radially internal/external" and "axially internal/external" are used with reference to a direction perpendicular and a direction parallel to the rotation axis of the tyre, respectively.

The terms "circumferential" and "circumferentially" are used with reference to the direction of the annular extension of the tyre, i.e. to the rolling direction of the tyre, which corresponds to a direction lying on a plane coinciding with or parallel to the equatorial plane of the tyre.

The terms: "cord" or "reinforcing cord" mean an element consisting of one or more thread-like elements (hereinafter also referred to as "threads") incorporated in a matrix of elastomeric material. According to the cases and the specific applications, the aforementioned thread-like elements may be made of textile and/or metal material.

By "reinforcing elements oriented in a substantially circumferential direction" it is meant that they form an angle of a few degrees (for example an angle between about 0° and 6°) with respect to the equatorial plane of the tyre.

The term "camber" or "camber angle" refers to the inclination of the wheel centreline with respect to the vertical to the ground when looking at the front of the vehicle.

By "sidewall reinforcing insert on the internal or external side" it is meant the sidewall reinforcing insert on the side of the tyre which, once mounted on the wheel and on the vehicle, is on the internal or external side of the vehicle, respectively.

By "side A" or "side B" of the tyre it is meant herein the side of the same which, once mounted on the vehicle, will be subjected to the least or greatest stress, respectively.

The term "phr" (acronym of "parts per hundred of rubbers") indicates parts by weight per 100 parts by weight of the total elastomeric base. Any additives (such as any elastomeric resins or extension oils) are not considered for the calculation of the 100 parts of the total elastomeric base.

Unless otherwise indicated, all the percentages are expressed as percentages by weight.

BRIEF DESCRIPTION OF THE FIGURE

FIG. 1 schematically shows the section of a self-supporting tyre for vehicle wheels according to the present invention.

DETAILED DESCRIPTION OF THE INVENTION

In the present description, tyre components and respective elastomeric compounds which are incorporated in the side of the tyre which is less stressed in use are marked with the letter A while those incorporated in the most stressed side with the letter B.

Typically, in the case of rear tyres, especially if they have a high camber, the less stressed side (A) is the outer side while the more stressed side (B) is the inner side.

The self-supporting tyre according to the invention may have one or more of the preferred features listed below. They may be combined as desired according to the application requirements.

The sidewall reinforcing insert of the side (B) may partially, substantially (for example more than 70% of its weight) or, preferably, completely consist of a vulcanised elastomeric compound (B) having a shear modulus value G' of less than 1.25 MPa measured at 70° C., 10 Hz, 9% strain according to the method disclosed in the present description.

The vulcanised elastomeric compound (B) may be characterised by the following dynamic and static mechanical properties.

Preferably, the vulcanised elastomeric compound (B) has a shear modulus value G' preferably of less than 1.20 MPa, more preferably less than 1.10 MPa, even more preferably less than 1.05 MPa, even more preferably less than 1.0 MPa or 0.95 MPa measured at 70° C., 10 Hz, 9% strain according to the RPA method disclosed in the present description.

Preferably, the vulcanised elastomeric compound (B) has a shear modulus value G' in the range between 0.50 and 1.25 MPa, more preferably between 0.70 and 1.10 MPa.

The vulcanised elastomeric compound (B) has a shear modulus value G' preferably greater than 0.50 MPa, more preferably greater than 0.70 MPa.

The vulcanised elastomeric compound (B) has a dynamic compression modulus value E' preferably of less than 7.50 MPa, more preferably less than 6.00 MPa, even more preferably less than 5.00 MPa measured at 23° C., 10 Hz according to the method disclosed in the present description.

The vulcanised elastomeric compound (B) has a dynamic compression modulus value E' preferably in the range from 3.00 to 8.00 MPa, more preferably from 3.50 to 7.50 MPa, even more preferably from 4.00 to 6.00 MPa.

The vulcanised elastomeric compound (B) has a Tan Delta value preferably not greater than 0.080, more preferably not greater than 0.072, even more preferably not greater than 0.060 measured at 70° C., 10 Hz according to the RPA method disclosed in the present description.

The vulcanised elastomeric compound (B) has a Tan Delta value preferably in the range from 0.030 to 0.080, more preferably from 0.035 to 0.072, even more preferably from 0.040 to 0.070 measured at 70° C., 10 Hz according to the RPA method disclosed in the present description.

The vulcanised elastomeric compound (B) has an elongation at break value AR (%) preferably greater than 150%, more preferably greater than 200%, even more preferably greater than 230% measured according to the UNI 6065: 2001 method.

The vulcanised elastomeric compound (B) has a tensile strength value CR (%) preferably of at least 5.0 MPa, preferably at least 7.0 MPa, more preferably at least 8.0 MPa, measured according to the UN16065:2001 method.

The vulcanised elastomeric compound (B) has a tensile strength value CR (%) preferably in the range from 6.0 to 25.0 MPa, preferably from 7.0 to 20.0 MPa, measured according to the UN16065:2001 method.

The Applicant has optimised the stiffness of the elastomeric compound (B) for the present purposes mainly by decreasing its content of reinforcing filler, preferably also by using particular white fillers instead of at least part of the conventional silica, and possibly by selecting a less rigid elastomeric component.

Preferably, the vulcanised elastomeric compound (B) is obtained by mixing and vulcanising an elastomeric composition (B) comprising at least 100 phr of at least one diene elastomeric polymer, at least one reinforcing filler in a total amount of less than 30% by weight with respect to the total weight of the composition, at least 0.1 phr of the at least one vulcanising agent.

The elastomeric composition (B) comprises at least 100 phr of at least one diene elastomeric polymer.

The diene elastomeric polymer may be selected from those commonly used in sulphur-vulcanisable elastomeric compositions, which are particularly suitable for producing tyres, i.e. from among solid elastomeric polymers or copolymers with an unsaturated chain having a glass transition temperature (Tg) generally lower than 20° C. preferably in the range from 40° C. to −110° C.

These polymers or copolymers may be of natural origin or may be obtained by solution polymerization, emulsion polymerization or gas-phase polymerization of one or more conjugated dienes, optionally mixed with at least one comonomer selected from monoolefins, monovinylarenes and/or polar comonomers in an amount not exceeding 60% by weight.

The conjugated dienes generally contain from 4 to 12, preferably from 4 to 8 carbon atoms and may be selected, for example, from the group comprising: 1,3-butadiene, isoprene, 2,3-dimethyl-1,3-butadiene, 1,3-pentadiene, 1,3-hexadiene, 3-butyl-1,3-octadiene, 2-phenyl-1,3-butadiene and mixtures thereof.

The monoolefins may be selected from ethylene and α-olefins generally containing from 3 to 12 carbon atoms, such as for example propylene, 1-butene, 1-pentene, 1-hexene, 1-octene or mixtures thereof.

Monovinylarenes, which may optionally be used as comonomers, generally contain from 8 to 20, preferably from 8 to 12 carbon atoms and may be selected, for example, from: styrene; 1-vinylnaphthalene; 2-vinylnaphthalene; various alkyl, cycloalkyl, aryl, alkylaryl or arylalkyl derivatives of styrene, such as, for example, α-methylstyrene, 3-methylstyrene, 4-propylstyrene, 4-cyclohexylstyrene, 4-dodecylstyrene, 2-ethyl-4-benzylstyrene, 4-p-tolyl-styrene, 4-(4-phenylbutyl)styrene, and mixtures thereof. Styrene is particularly preferred.

Polar comonomers that may optionally be used, may be selected, for example, from among acrylic acid and alkylacrylic acid esters, acrylonitriles, or mixtures thereof, such as, for example, methyl acrylate, ethyl acrylate, methyl methacrylate, ethyl methacrylate, acrylonitrile and mixtures thereof.

The diene elastomeric polymer may be selected, for example, from among: cis-1,4-polyisoprene (natural or synthetic, preferably natural rubber), 3,4-polyisoprene, polybutadiene (in particular polybutadiene with a high content of 1,4-cis), optionally halogenated isoprene/isobutene copolymers, 1,3-butadiene/acrylonitrile copolymers, styrene/1,3-butadiene copolymers, styrene/isoprene/1,3-butadiene copolymers, styrene/1,3-butadiene/acrylonitrile copolymers, and mixtures thereof. The elastomeric composition (B) may possibly comprise at least one polymer of one or more monoolefins with an olefinic comonomer or derivatives thereof. The monoolefins may be selected for example from among ethylene and α-olefins generally containing from 3 to 12 carbon atoms, such as for example propylene, 1-butene, 1-pentene, 1-hexene, 1-octene or mixtures thereof. Among these copolymers, ethylene/propylene (EPR) or ethylene/propylene/diene (EPDM) copolymers are preferred.

The above-mentioned polymers may optionally be functionalised along the main chain or at the ends thereof.

The functional group may be introduced into the elastomeric polymer by processes known in the art such as, for example, during the production of the elastomeric polymer by copolymerisation with at least one corresponding functionalised monomer containing at least one ethylene unsaturation; or by subsequent modification of the elastomeric polymer by grafting at least one functionalised monomer in the presence of a free radical initiator (for example, an organic peroxide).

Alternatively, the functionalisation may be introduced by reaction with suitable terminating agents or coupling agents. In particular, the diene elastomeric polymers obtained by anionic polymerization in the presence of an organometallic initiator (in particular, an organolithium initiator) may be functionalised by reacting the residual organometallic groups derived from the initiator with suitable terminating agents or coupling agents such as, for example, amines, amides, imines, carbodiimides, alkyltin halides, substituted benzophenones, alkoxysilanes, aryloxy silanes, alkyldithiols, alkyldithiolsilanes, carboxyalkylthiols, carboxyalkylthiolsilanes, and thioglycols.

Useful examples of terminating agents or coupling agents are known in the art and described, for example in patents EP2408626, EP2271682, EP3049447A1, EP2283046A1, EP2895515A1, EP451604, U.S. Pat. No. 4,742,124, WO2015086039A1 and WO2017211876A1.

Preferably, said at least one functionalised elastomeric polymer is obtained from polybutadiene (in particular polybutadiene with a high 1,4-cis content), styrene/1,3-butadiene copolymers, styrene/isoprene/1,3-butadiene copolymers, styrene/1,3-butadiene/acrylonitrile copolymers, and mixtures thereof.

The elastomeric composition (B) may comprise two or more elastomeric polymers as defined above, in a mixture.

Preferably, the elastomeric composition (B) comprises polybutadiene in an amount of less than 50 phr, more preferably less than 30 phr, even more preferably less than 20 phr. Preferably, the elastomeric composition (B) does not comprise polybutadiene.

Preferably, the elastomeric composition (B) comprises:

70 to 100 phr of a synthetic or natural polyisoprene or mixtures thereof, 0 to 30 phr of a polybutadiene.

More preferably, the elastomeric composition (B) comprises:

80 to 100 phr of a synthetic or natural polyisoprene or mixtures thereof, 0 to 20 phr of a polybutadiene.

The term "polyisoprene" refers to isoprene polymers and copolymers.

The term "polybutadiene" refers to butadiene polymers and copolymers.

The elastomeric composition (B) for tyres according to the present invention comprises at least one reinforcing filler in a total amount preferably of less than 27%, more preferably less than 25% or 20% by weight with respect to the total weight of the composition.

Preferably, the reinforcing filler is present in a total amount in the range from 5% to 30% more preferably from 5% to 26% or from 10% to 20% by weight with respect to the total weight of the composition.

Preferably, the reinforcing filler is selected from carbon black, white fillers, silicate fibres, derivatives thereof and mixtures thereof.

In one embodiment, said reinforcing filler comprises carbon black.

Preferably, the carbon black is selected from those having a surface area not smaller than 20 m$^2$/g, preferably of about 40-50 m$^2$/g (as determined by STSA-statistical thickness surface area according to ISO 18852:2005).

The carbon black may be, for example, N234, N326, N330, N375 or N550, N660 marketed by Birla Group (India) or by Cabot Corporation, preferably N550 or N660.

In an embodiment, said reinforcing filler is a white filler selected from among hydroxides, oxides and hydrated oxides, salts and hydrated salts of metals, silicates fibres, derivatives thereof and mixtures thereof.

In one embodiment, said reinforcing filler may comprise silica, for example selected from pyrogenic silica, precipitated amorphous silica, wet silica (hydrated silicic acid), anhydrous silica (anhydrous silicic acid), or mixtures thereof.

The silica that may be used in the present invention may have a BET surface area (measured according to ISO standard 5794/1) in the range from 10 m$^2$/g to 300 m$^2$/g, preferably from 30 m$^2$/g to 250 m$^2$/g, more preferably from 40 to 190 m$^2$/g. Commercial examples of suitable silicas are Zeosil 1165 MP, Zeosil 1115 MP, Zeosil 185 GR, Efficium from Solvay, Newsil HD90 and Newsil HD200 from Wuxi, K160 and K195 from Wilmar, H160AT and H180 AT from IQE, Zeopol 8755 and 8745 from Huber, Perkasil TF100 from Grace, Hi-Sil EZ 120 G, EZ 160G, EZ 200G from PPG, Ultrasil 7000 GR and Ultrasil 9100 GR from Evonik. Another example of suitable silica is the rice husk silica described in WO2019229692A1.

In one embodiment, said reinforcing filler comprises silica mixed with carbon black.

In one embodiment, said reinforcing filler comprises a modified silica.

Silica may be modified for example by reaction with silsequioxanes (as in WO2018078480A1), by reaction with pyrroles (as in WO2016050887A1) or by reaction with silanising agents, such as bis(triethoxysilylpropyl)tetrasulphide (TESPT), 3-aminopropyltriethoxysilane (APTES) 3-glycidyloxypropyltriethoxysilane triethoxy(octyl)silane, triethoxy(ethyl)silane, triethoxy-3-(2-imidazolin-1-yl)propylsilane, triethoxy-p-tolylsilane, triethoxy(1-phenylethenyl)silane, triethoxy-2-thienylsilane, 1H,1H,2H,2H-perfluorooctyltriethoxysilane, 3-(triethoxysilyl)propyl isocyanate, 1H,1H,2H,2H-perfluorodecylthriethoxysilane, isobutyltriethoxysilane, n-octadecyltriethoxysilane, (3-chloropropyl) triethoxysilane, triethoxysilane and 3-(triethoxysilyl)propionitrile.

Commercial examples of suitable silanising agents are Si69, Dynasilan AMEO and Dynasilan GLYEO from Evonik.

The modified silica may be a sulphurised silanised silica.

Sulphurised silanised silica is a silica prepared by reaction of a silica, such as fumed silica, precipitated amorphous silica, wet silica (hydrated silicic acid), anhydrous silica (anhydrous silicic acid), or mixtures thereof, or of a metal silicate, such as aluminium silicate, sodium silicate, potassium silicate, lithium silicate or mixtures thereof, with at least one sulphurised silanising agent.

The term "sulphurised silanising agent" indicates an organic derivative of silicon containing mercapto, sulphide, disulphide or polysulphide groups, said derivative being capable of reacting with the OH groups of silica.

A commercial example of suitable sulphurised silanised silica is Agilon 400 silica from PPG.

In one embodiment, said reinforcing filler comprises a modified silica mixed with carbon black.

In one embodiment, said reinforcing filler comprises silicates.

In one embodiment, said silicates are lamellar silicates, such as bentonites, alloysite, laponite, saponite, vermiculite or hydrotalcite.

In one embodiment, said silicates are modified lamellar silicates analogously to what is described below for modified silicate fibres.

In one embodiment, said silicates are silicate fibres. These fibres typically have nano dimensions and have needle-like morphology.

The silicate fibres are preferably selected from sepiolite fibres, paligorskite fibres (also known as attapulgite), wollastonite fibres, imogolite fibres and mixtures thereof.

In one embodiment, said reinforcing filler comprises silicate fibres mixed with carbon black.

In one embodiment, said silicate fibres are modified silicate fibres.

In one embodiment, the modified silicate fibres may be for example fibres modified by acid treatment with partial removal of magnesium, such as those described and exemplified in patent application WO2016/174629A1.

In one embodiment, the modified silicate fibres may be for example fibres modified by deposition of amorphous silica on the surface, such as those described and exemplified in patent application WO2016/174628A1.

In one embodiment, the modified silicate fibres may be fibres organically modified by reaction, for example, with quaternary ammonium salts such as sepiolite fibres modified by reaction with talloyl benzyl dimethyl ammonium chloride marketed by Tolsa under the name Pangel B5.

In one embodiment, the modified silicate fibres may be fibres modified by reaction with a silanising agent selected for example from mono or bifunctional silanes with one or two or three hydrolysable groups such as bis-(3-triethoxysilyl-propyl)disulphide (TESPD), bis(3-triethoxysilyl-propyl) tetrasulphide (TESPT), 3-thio-octanoyl-1-propyl-triethoxysilane (NXT), Me$_2$Si(OEt)$_2$, Me$_2$PhSiCl, Ph$_2$SiCl$_2$.

In one embodiment, said reinforcing filler comprises modified silicate fibres mixed with carbon black.

In a preferred embodiment, said reinforcing filler comprises sepiolite fibres.

In a preferred embodiment, said reinforcing filler comprises a white filler prepared as described in WO2019106562A1.

Particularly preferred are the reinforcing filler M2 prepared according to Example 1, the reinforcing filler M4A prepared according to Example 2, and the reinforcing filler M6 prepared according to Example 3 of the patent application WO2019106562A1 in the name of the Applicant. These white charges will hereafter be referred to as: SilSep1 (reinforcing filler M2 prepared according to Example 1 of patent application WO2019/106562A1), SilSep2 (reinforcing filler M6 prepared according to Example 3 of patent application WO2019/106562A1) and SilSep3 (reinforcing filler M4A prepared according to Example 2 of patent application WO2019/106562A1).

In a preferred embodiment, said reinforcing filler comprises carbon black, silica and sepiolite fibres.

In a more preferred embodiment, said reinforcing filler comprises carbon black in the range from 0 to 10 phr, silica in the range from 5 to 20 phr and sepiolite fibres in the range from 5 to 20 phr.

In an even more preferred embodiment, said reinforcing filler comprises carbon black in the range from 0 to 6 phr and SilSep1 and/or SilSep2 and/or SilSep3 in a total amount in the range from 10 to 20 phr.

The Applicant has observed that the balance between rolling resistance and run-flat traveling is particularly favourable if part or all of the conventional silica in the elastomeric composition (B) is replaced with SilSep1, SilSep2 and/or SilSep3.

The elastomeric composition (B) for tyre compounds according to the invention may comprise from 0.1 to 10 phr of a vulcanising agent.

Preferably, the composition comprises at least 0.2 phr, 0.5 phr, 0.8 phr or 1 phr of at least one vulcanising agent.

Preferably, the composition comprises from 0.1 to 10 phr, from 0.2 to 10 phr, from 1 to 10 phr or from 1.5 to 5 phr of at least one vulcanising agent.

The at least one vulcanising agent is preferably selected from sulphur, or alternatively, sulphurised agents (sulphur donors), such as, for example, bis[(trialkoxysilyl)propyl] polysulphides, thiurams, dithiodimorpholines and caprolactam-disulphide and mixtures thereof. Alternatively, the vulcanising agent is a peroxide which contains an O—O bond and may generate reactive radicals by heating.

Preferably, the vulcanising agent is sulphur, preferably selected from soluble sulphur (crystalline sulphur), insoluble sulphur (polymeric sulphur), (iii) oil-dispersed sulphur and mixtures thereof.

Commercial examples of vulcanising agents suitable for use in the elastomeric composition (B) of the invention are Redball Superfine sulphur from International Sulfur Inc., Crystex™ OT 33 AS sulphur and Eastmann Crystex™ HS OT 20 sulphur.

In the present elastomeric composition (B), the vulcanising agent may be used together with adjuvants such as vulcanisation activators, accelerants and/or retardants known to those skilled in the art.

The elastomeric composition (B) may optionally comprise at least one vulcanisation activating agent.

The vulcanisation activating agents suitable for use in present elastomeric composition (B) are zinc compounds, in particular ZnO, ZnCO$_3$, zinc salts of saturated or unsaturated fatty acids containing from 8 to 18 carbon atoms, which are preferably formed in situ in the elastomeric composition (B) by reaction of ZnO and of the fatty acid or mixtures thereof. For example, zinc stearate is used, preferably formed in situ in the elastomeric composition (B), by ZnO and fatty acid, or magnesium stearate, formed by MgO, or mixtures thereof.

The vulcanisation activating agents may be present in the elastomeric composition (B) of the invention in amounts preferably from 0.2 phr to 15 phr, more preferably from 1 phr to 5 phr.

Preferred activating agents derive from the reaction of zinc oxide and stearic acid.

An example of activator is the product Aktiplast ST marketed by Rheinchemie.

The elastomeric composition (B) may further comprise at least one vulcanisation accelerant.

Vulcanisation accelerants that are commonly used may be for example selected from dithiocarbamates, guanidines, thioureas, thiazoles, sulphenamides, sulphenimides, thiurams, amines, xanthates, or mixtures thereof.

Preferably, the accelerant agent is selected from mercaptobenzothiazole (MBT), N-cyclohexyl-2-benzothiazol-sulphenamide (CBS), N-tert-butyl-2-benzothiazol-sulphenamide (TBBS) and mixtures thereof.

Commercial examples of accelerants suitable for use in the present elastomeric composition (B) are N-cyclohexyl-2-benzothiazyl-sulphenamide Vulkacit@ (CBS or CZ), and N-terbutyl 2-benzothiazil sulphenamide, Vulkacit@ NZ/EGC marketed by Lanxess.

Vulcanisation accelerants may be used in the present elastomeric composition (B) in an amount preferably from 0.05 phr to 10 phr, preferably from 0.1 phr to 7 phr, more preferably from 0.5 phr to 5 phr.

The elastomeric composition (B) may optionally comprise at least one vulcanisation retardant agent.

The vulcanisation retardant agent suitable for use in the present elastomeric composition (B) is preferably selected from urea, phthalic anhydride, N-nitrosodiphenylamine N-cyclohexylthiophthalimide (CTP or PVI) and mixtures thereof.

A commercial example of a suitable retardant agent is N-cyclohexylthiophthalimide VULKALENT G of Lanxess.

The vulcanisation retardant agent may be present in the present elastomeric composition (B) in an amount of preferably from 0.05 phr to 2 phr.

The present elastomeric composition (B) may comprise one or more vulcanisation retardant agents as defined above in a mixture.

Depending on the elastomeric composition (B), those skilled in the art may adapt the composition of the vulcanisation package and the cross-linking conditions in order to impart a cross-linking degree to the vulcanised elastomeric compound (B) commensurate with the non-exceeding of the shear modulus value G' set according to the present invention.

The elastomeric composition (B) may further comprise at least 0.05 phr, preferably at least 0.1 phr or 0.5 phr or 0.7 phr, more preferably at least 1 phr or 2 phr of at least one silane coupling agent capable of interacting with the silica-based reinforcing fillers and to bind them to elastomeric polymers during vulcanisation.

Preferably, the silane coupling agent is present in an amount of at least 7% by weight, more preferably at least 9% by weight with respect to the weight of white filler.

Preferably, the elastomeric composition (B) comprises from 0.1 phr to 20.0 phr or from 0.5 phr to 10.0 phr, even more preferably from 1.0 phr to 5.0 phr of at least one silane coupling agent.

Preferably, said coupling agent is a silane coupling agent selected from those having at least one hydrolysable silane group which may be identified, for example, by the following general formula (III):

$$(R')_3Si-C_nH_{2n}X \qquad (III)$$

wherein the groups R', equal or different from each other, are selected from: alkyl, alkoxy or aryloxy groups or from halogen atoms, provided that at least one of the groups R' is an alkoxy or an aryloxy group; n is an integer of from 1 to 6; X is a group selected from: nitrose, mercapto, amino, epoxide, vinyl, imide, chloro, $-(S)_mC_nH_{2n}Si-(R')_3$ and $-S-COR'$, wherein m and n are integers of from 1 to 6 and the groups R' are as defined above.

Particularly preferred silane coupling agents are bis(3-triethoxysilylpropyl)tetrasulphide, 3-thio-octanoyl-1-propyl-triethoxysilane (NXT) and bis(3-triethoxysilyl-propyl)disulphide. Said coupling agents may be added as such or in mixture with an inert filler (such as carbon black) so as to facilitate their incorporation into the elastomeric composition (B).

An example of the silane coupling agent is TESPT: bis(3-triethoxysilylpropyl)tetrasulphide Si69 marketed by Evonik.

The elastomeric composition (B) may further comprise one or more additional ingredients, commonly used in the field, such as for example plasticising oils, resins, antioxidant and/or antiozonating agents (anti-aging agents), waxes, adhesives and the like.

For example, the elastomeric composition (B) according to the present invention, in order to further improve the workability of the compound, may further comprise at least one plasticising oil.

The amount of plasticiser is preferably in the range from 0.5 to 10 phr, preferably from 1 to 7 phr.

The term "plasticising oil" means a process oil derived from petroleum or a mineral oil or a vegetable oil or a synthetic oil or combinations thereof.

The plasticising oil may be a process oil derived from petroleum selected from paraffins (saturated hydrocarbons), naphthenes, aromatic polycyclic and mixtures thereof.

Examples of suitable process oils derived from petroleum are aromatic, paraffinic, naphthenic oils such as MES (Mild Extract Solvated), DAE (Distillate Aromatic Extract), TDAE (Treated Distillate Aromatic Extract), TRAE (Treated Residual Aromatic Extract), RAE (Residual Aromatic Extract) known in the industry.

The plasticising oil may be an oil of natural or synthetic origin derived from the esterification of glycerol with fatty acids, comprising glycerine triglycerides, diglycerides, monoglycerides or mixtures thereof.

Examples of suitable vegetable oils are sunflower, soybean, linseed, rapeseed, castor and cotton oil.

The plasticising oil may be a synthetic oil selected from among the alkyl or aryl esters of phthalic acid or phosphoric acid.

The elastomeric composition (B) according to the present invention may further comprise at least one resin.

The resin is a non-reactive resin, preferably selected from among hydrocarbon resins, phenolic resins, natural resins and mixtures thereof.

The amount of resin is preferably in the range from 0.5 to 10 phr, more preferably from 1 to 5 phr.

The elastomeric composition (B) may optionally comprise at least one wax. The wax may be for example a petroleum wax or a mixture of paraffins.

Commercial examples of suitable waxes are the Repsol N-paraffin mixture and the Antilux® 654 microcrystalline wax from Rhein Chemie.

The wax may be present in the elastomeric composition (B) of the invention in an overall amount generally from 0.1 phr to 5 phr, preferably from 0.5 phr to 3 phr.

The elastomeric composition (B) may optionally comprise at least one antioxidant agent.

The antioxidant agent is preferably selected from N-isopropyl-N'-phenyl-p-phenylenediamine (IPPD), N-(-1,3-dimethyl-butyl)-n'-phenyl-p-phenylenediamine (6PPD), N,N'-bis-(1,4-dimethyl-pentyl)-p-phenylenediamine (77PD), N,N'-bis-(1-ethyl-3-methyl-pentyl)-p-phenylenediamine (DOPD), N,N'-bis-(1,4-dimethyl-pentyl)-p-phenylenediamine, N,N'-diphenyl-p-phenylenediamine (DPPD), N,N'-ditolyl-p-phenylenediamine (DTPD), N,N'-di-beta-naphthyl-p-phenylenediamine (DNPD), N,N'-bis(1-methylheptyl)-p-phenylenediamine, N,N'-Di-sec-butyl-p-phenylenediamine (44PD), N-phenyl-N-cyclohexyl-p-phenylenediamine, N-phenyl-N'-1-methylheptyl-p-phenylenediamine and the like and mixtures thereof, preferably it is N-1,3-dimethylbutyl-N-phenyl-p-phenylenediamine (6-PPD).

A commercial example of a suitable antioxidant agent is 6PPD from Solutia/Eastman or Santoflex produced by Flexsys.

The antioxidant agent may be present in the elastomeric composition (B) in an overall amount preferably from 0.1 phr to 6 phr, more preferably from 0.5 phr to 4 phr.

In the self-supporting tyre of the present invention, the sidewall reinforcing insert (A) preferably consists of the vulcanised elastomeric compound (A).

The vulcanised elastomeric compound (A) may be characterised by the following dynamic and static mechanical properties.

The vulcanised elastomeric compound (A) preferably has a shear modulus value G' of at least 1.30 MPa, more preferably at least 1.40 MPa, even more preferably at least 1.60 MPa.

Preferably, the vulcanised elastomeric compound (A) has a shear modulus value G' in the range between 1.25 and 3.5 MPa, more preferably between 1.40 and 2.5 MPa.

Preferably, the vulcanised elastomeric compound (A) has a dynamic compression modulus value E' preferably greater than 7.5 MPa, more preferably greater than 8.00 MPa, even more preferably greater than 8.50 MPa measured at 23° C., 10 Hz according to the method disclosed in the present description.

Preferably, the vulcanised elastomeric compound (A) has a dynamic compression modulus value E' at 23° C., 10 Hz in the range from 7.50 to 15.00 MPa, more preferably from 8.00 to 10.00 MPa, even more preferably from 8.00 to 9.50 MPa.

Preferably, the vulcanised elastomeric compound (A) has a Tan Delta value greater than 0.040, more preferably greater than 0.045, even more preferably greater than 0.050 measured at 70° C., 10 Hz according to the RPA method disclosed in the present description.

Preferably, the vulcanised elastomeric compound (B) has a Tan Delta value lower than that of the vulcanised elastomeric compound (A) measured at 70° C., 10 Hz according to the RPA method disclosed in the present description.

Preferably, the vulcanised elastomeric compound (A) is obtained by mixing and vulcanising an elastomeric composition (A) comprising at least 100 phr of at least one diene elastomeric polymer, at least one reinforcing filler in a total amount of at least 25% by weight with respect to the total weight of the composition, at least 0.1 phr of the at least one vulcanising agent.

The elastomeric composition (A) comprises at least 100 phr of at least one diene elastomeric polymer as defined above for the elastomeric composition (B).

Preferably, the elastomeric composition (A) comprises polybutadiene in an amount greater than 20 phr, more preferably greater than 30 phr, even more preferably than 40 phr.

Preferably, the elastomeric composition (A) comprises:

20 to 70 phr of a synthetic or natural polyisoprene or mixtures thereof, and 30 to 80 phr of a polybutadiene.

More preferably, the elastomeric composition (A) comprises:

30 to 60 phr of a synthetic or natural polyisoprene or mixtures thereof, and 40 to 70 phr of a polybutadiene.

The term "polyisoprene" refers to isoprene polymers and copolymers.

The term "polybutadiene" refers to butadiene polymers and copolymers.

The elastomeric composition (A) comprises at least one reinforcing filler as defined above in a total amount preferably equal to at least 25%, more preferably equal to at least 28% or 30% by weight with respect to the total weight of the elastomeric composition (A).

Preferably, in the elastomeric composition (A) the reinforcing filler is present in a total amount comprised between 25% and 40% more preferably between 27% and 35% by weight with respect to the total weight of the elastomeric composition (A). The elastomeric composition (A) may further comprise one or more of the other ingredients, and in the amounts, described above for the elastomeric composition (B).

Depending on the elastomeric composition (A), the skilled in the art may adapt the composition of the vulcanisation package and the cross-linking conditions in order to impart a cross-linking degree to the vulcanised elastomeric compound (A) commensurate with the shear modulus value G' set according to the present invention.

In a preferred embodiment, the self-supporting tyre of the invention is characterised in that the sidewall reinforcing insert of the side (A) consists of an elastomeric compound (A) having a shear modulus value G' of at least 1.30 MPa, preferably at least 1.40 MPa, more preferably at least 1, 60 MPa, while the sidewall reinforcing insert of the side (B) consists of an elastomeric compound (B) having a shear modulus value G' of less than 1.10 MPa, preferably less than 1.05 MPa, more preferably less than 1.0 MPa or 0.95 MPa, said moduli G' being measured at 70° C., 10 Hz, 9% strain according to the method disclosed in the present description.

In the self-supporting tyre according to the invention, the sidewall reinforcing insert of the side (B) and the sidewall reinforcing insert of the side (A) may have the same maximum thickness (Li-A=Li—B) or have a different maximum thickness.

In one embodiment of the present self-supporting tyre, the sidewall reinforcing inserts of side (A) and side (B) have the same thickness. In such embodiment, both reinforcing inserts may have a maximum axial extension L-i for example from a minimum of 3 mm to a maximum of 14 mm, preferably from 5 to 12 mm, more preferably from 7 to 10 mm, measured in the direction perpendicular to the plane Ti tangent to the outer surface of the sidewall reinforcing insert, depending on the desired performance, on the section height of the tyre, its load and speed index.

For example, in the case of a conventional self-supporting tyre with a nominal section height of 80 mm, the thickness of the sidewall reinforcing inserts typically ranges from 3 to 5 mm, in the case of a nominal section height of 100 mm, from 5 to 7 mm while in the case of nominal section height of 130 mm, from 7 to 10 mm.

In one embodiment of the present self-supporting tyre, the reinforcing inserts on the inner and outer side may have a different maximum thickness.

In a first case, the maximum axial extension of the sidewall reinforcing insert of the side (B) is preferably greater than the maximum axial extension of the sidewall reinforcing insert of the side (A) by at least 5%, preferably at least 10%, especially in the case of poor camber, to further improve the rolling resistance.

In such embodiment, the sidewall reinforcing insert of the side (B) may have a maximum axial extension, for example from a minimum of 4 mm to a maximum of 14 mm, preferably from a minimum of 5 mm to a maximum of 12 mm while the sidewall reinforcing insert of the side (A) may have a maximum axial extension, for example from a minimum of 3 mm to a maximum of 13 mm, preferably from a minimum of 4 mm to a maximum of 11 mm.

In a second case, the maximum axial extension of the sidewall reinforcing insert of the side (B) is preferably less than the maximum axial extension of the sidewall reinforcing insert of the side (A) by at least 5%, preferably at least 10% to improve flat-running performance, especially in the case of very high camber.

In such embodiment, the sidewall reinforcing insert of the side (B) may have a maximum axial extension, for example from a minimum of 3 mm to a maximum of 13 mm, preferably from a minimum of 4 mm to a maximum of 12 mm while the sidewall reinforcing insert of the side (A) may have a maximum axial extension, for example from a minimum of 4 mm to a maximum of 14 mm, preferably from a minimum of 5 mm to a maximum of 13 mm.

In the tyre of the present invention, especially when the elastomeric composition (B) comprises a particularly low amount of reinforcing filler and/or high modulus elastomeric polymers, the maximum axial extension of the sidewall reinforcing insert of side (B) may be increased for example by 1 mm, up to a maximum of 14 mm, preferably no more than 11 mm, more preferably no more than 10 mm in total thickness.

The sidewall reinforcing insert (A) and (B) may be arranged, inside the sidewall structure for each sidewall of the tyre, from the bead portion to the shoulder portion.

In one embodiment of the present tyre, the sidewall reinforcing inserts are arranged at a position axially internal to the carcass structure In one embodiment of the present tyre, the sidewall reinforcing inserts are arranged at a position axially external to the carcass structure.

Examples of sidewall reinforcing insert (A) and (B) are the elements (113A) and (113B) shown in FIG. 1.

A preferred embodiment of the self-supporting tyre of the invention comprises a carcass structure having opposing side edges associated with respective annular anchoring structures;

a belt structure applied in a position radially external to the carcass structure;

a tread band applied in a position radially external to the belt structure;

a pair of sidewall structures each including a sidewall extended in a position axially external to the carcass structure and extended radially between one of the annular anchor structures and an axially external portion of the tread band;

a layer of air-impermeable elastomeric material, called liner, at the most radially internal position of the tyre and extending at least at the tread band; and a pair of sidewall reinforcing inserts, each insert being incorporated in the respective sidewall structure, in a position axially internal to each of the sidewalls and axially external to the layer of air-impermeable elastomeric material characterised in that the sidewall reinforcing insert of the side (A) comprises an elastomeric compound (A) having a shear modulus value G' of at least 1.25 MPa, while the sidewall reinforcing insert of side (B) comprises an elastomeric compound (B) having a shear modulus value G' of less than 1.25 MPa, said moduli G' being measured at 70° C., 10 Hz, 9% strain according to the method disclosed in the present description.

In a preferred embodiment, said liner extends from one bead structure to the other.

When applicable, all the preferences described above for the tyre of the invention in general also characterise in particular the tyre of the invention comprising said liner.

The self-supporting tyre according to the invention may further comprise an underliner.

The underliner (see element (112a) in the representation of FIG. 1) is a layer of elastomeric material arranged in a position radially external to the liner, i.e. between the liner and the carcass structure, preferably for the entire extension of the liner.

In one embodiment of the present tyre, the underliner and liner extend only for the tread portion.

In one embodiment of the present tyre, the underliner and liner extend from one bead structure to the other.

In one embodiment of the present tyre, at least the underliner extends from one bead structure to the other.

In one embodiment of the present tyre, the liner extends across the tread portion while the underliner from one bead structure to the other.

Typically, the underliner consists of elastomeric compounds with a high content of reinforcing filler and therefore high viscosity, in order to protect the liner from any movement of the carcass cords during the tyre conformation, in the tyre building process.

In a preferred embodiment of the self-supporting tyres of the invention, the Applicant has found that the underliner may advantageously comprise or preferably consist of the vulcanised elastomeric compound (B) described above, a low modulus compound, low content of reinforcing filler and reduced viscosity, with unexpected advantages especially in terms of increased flat-run distance with the same low rolling resistance (see the performance of the tyres PN4 and PN5 in Table 3 and related comments).

Therefore, in a preferred embodiment, the self-supporting tyre of the invention comprises:

a carcass structure having opposing side edges associated with respective annular anchoring structures;

a belt structure applied in a position radially external to the carcass structure;

a tread band applied in a position radially external to the belt structure;

a pair of sidewall structures each including a sidewall extended in a position axially external to the carcass structure and extended radially between one of the annular anchor structures and an axially external portion of the tread band;

a layer of air-impermeable elastomeric material, called liner, at the most radially internal position of the tyre extending at least at the tread band;

a pair of sidewall reinforcing inserts, each insert being embedded in the respective sidewall structure, at a position axially internal to each of the sidewalls, and a layer of elastomeric material, called underliner, in a position radially external to said liner, radially internal to said carcass structure, axially internal to said sidewall reinforcing inserts and extending, preferably, not further than the extension of the liner, characterised in that the sidewall reinforcing insert of the side (A) consists of an elastomeric compound (A) having a shear modulus value G' of at least 1.25 MPa, and the sidewall reinforcing insert of side (B) and the underliner consist of an elastomeric compound (B) having a shear modulus value G' of less than 1.25 MPa, said moduli G' being measured at 70° C., 10 Hz, 9% strain according to the method disclosed in the present description.

Preferably, when present, the underliner has a thickness comprised between 0.4 and 2 mm, more preferably between 0.5 and 1 mm.

In one embodiment of the present tyre, the side reinforcing inserts are positioned between the underliner and the carcass structure.

In a more preferred embodiment, the self-supporting tyre according to the invention comprises:

a carcass structure having opposing side edges associated with respective annular anchoring structures;

a belt structure applied in a position radially external to the carcass structure;

a tread band applied in a position radially external to the belt structure;

a pair of sidewall structures each including a sidewall extended in a position axially external to the carcass structure and extended radially between one of the annular anchor structures and an axially external portion of the tread band;

a layer of air-impermeable elastomeric material, called liner, at the most radially internal position of the tyre extending at least at the tread band;

a pair of sidewall reinforcing inserts, each insert being embedded in the respective sidewall structure, at a position axially internal to each of the sidewalls, and a layer of elastomeric material, called underliner, in a position radially external to said liner, radially internal to said carcass structure, axially internal to said sidewall reinforcing inserts and extending, preferably, not further than the extension of the liner, characterised in that the sidewall reinforcing insert of the side (A) consists of an elastomeric compound (A) having a shear modulus value G' of 1.30 MPa, preferably at least 1.40 MPa, more preferably at least 1.60 MPa, and the sidewall reinforcing insert of the side (B) and the underliner preferably comprise an elastomeric compound (B) having a shear modulus value G' of less than 1.10 MPa, preferably less than 1.05 MPa, more preferably less than 0.95 MPa, said moduli G' being measured at 70° C., 10 Hz, 9% strain according to the method disclosed in the present description.

In this preferred embodiment, the maximum axial extension of the sidewall reinforcing insert respectively of the inner and outer side of the tyre is between 4 and 14 mm, more preferably between 5 and 12 mm, measured in a direction perpendicular to the plane Ti tangent to the outer surface of the sidewall reinforcing insert.

In the preferred embodiments of the self-supporting tyre of the invention, the vulcanised elastomeric compound (B) is obtained by mixing and vulcanising an elastomeric composition (B) comprising at least 100 phr of at least one diene elastomeric polymer, at least one reinforcing filler in a total amount of less than 30%, preferably less than 27%, more preferably less than 25% or 20% by weight with respect to the total weight of the elastomeric composition, at least 0.1 phr of the at least one vulcanising agent.

In a particularly preferred embodiment, said reinforcing filler comprises sepiolite and silica fibres.

In the self-supporting tyre according to the present invention, on the most radially internal surface of the liner, further tyre components may be optionally applied, such as for example soundproofing systems, sealants or sensors.

Preferably, the self-supporting tyre of the invention is non-directional, i.e. no preferred rolling direction is engraved on the sidewalls of the tyre and the design of the tread pattern is such that the tread performances are of the same order as the tyre used in one of the two possible rolling directions for the tyre. The use of non-directional tyres in facts allows production to be simplified. A single non-directional tyre model according to the invention may be used for the same axis. If, on the other hand, the tyre is directional, it is necessary to have tyres according to the invention differentiated according to whether they are mounted on the left or right side of the vehicle.

The self-supporting tyre of the invention will preferably be mounted on the car by positioning the reinforcing insert on the side with the lowest modulus (B) towards the side subject to the greatest strain (side B).

For example, in the case of a rear tyre with a high negative camber, the tyre should be mounted so that the reinforcing insert on the side with a lower modulus (B) is towards the inside of the car.

On the other hand, in the case of a front tyre with zero or close to zero camber, the tyre may be mounted so that the reinforcing insert on the side with the lowest modulus (B) is located towards the outside of the car.

Preferably, the self-supporting tyre of the invention is a tyre for automobiles.

In one embodiment, the self-supporting tyre of the invention is a rear tyre that will be mounted on the car with the side (B), i.e. with the side comprising the sidewall reinforcing insert comprising the elastomeric compound (B) having a value of shear modulus G' of less than 1.25 MPa, facing inwards.

In another embodiment, the self-supporting tyre of the invention is a front tyre which may be mounted on the car with the side (B), i.e. with the side comprising the sidewall reinforcing insert comprising the elastomeric compound (B) having a value of shear modulus G' of less than 1.25 MPa, preferably facing outwards.

The self-supporting tyre of the invention is suitable for four-wheeled vehicles for road use, as tyres adapted to equip small utility cars, medium and high powered passenger cars (maximum chord size for example from 145 mm to 355 mm).

These tyres are preferably mounted on rims having seating diameters equal to or larger than 13 inches, preferably not larger than 24 inches, more preferably of between 16 inches and 23 inches. In general, the tyre according to the invention may be a tyre for passenger cars, including both automobile tyres, such as for example the high-performance tyres defined below, and tyres for light transport vehicles, for example vans, campers, pick-up, typically with total mass at full load equal to or less than 3500 kg. Therefore, tyres for heavy transport vehicles are excluded.

The self-supporting tyre of the invention may be an HP (High Performance) or UHP (Ultra High Performance) tyre intended for equipping vehicles for the transport mainly of people, such as Sedan, Minivan, family, SUVs (Sport Utility Vehicles) and/or CUVs (Crossover Utility Vehicles), typically tyres that allow driving at high speeds.

The high and ultra-high performance tyres are in particular those which allow to reach speeds higher than at least 160 km/h, higher than 200 km/h up to over 300 km/h.

In the present description, when reference is made to tyres for passenger cars, this includes both automobile tyres, such as for example the high-performance tyres defined above, and tyres for light transport vehicles, for example vans, campers, pick-up, typically with a total mass at full load equal to or less than 3500 kg. Therefore, tyres for heavy transport vehicles are excluded.

Examples of such tyres are those belonging to the classes "T", "U", "H", V, "Z", "W" "Y" according to the E.T.R.T.O. standard (European Tyre and Rim Technical Organisation) and competition tyres (racing), in particular for four-wheel high-power vehicles. Typically, tyres belonging to these classes have a section width equal to or greater than 185 mm, preferably of between 195 mm and 385 mm, more preferably of between 195 mm and 355 mm. These tyres are preferably mounted on rims having seating diameters equal to or larger than 13 inches, preferably not larger than 24 inches, more preferably of between 16 inches and 23 inches.

By SUV and CUV it is meant vehicles with raised distribution, typically four-wheel drive, typically having a displacement greater than or equal to 1800 cc, more preferably of between 2000 cc and 6200 cc. Preferably, these vehicles have a mass greater than 1,400 kg, more preferably of between 1500 Kg and 3000 Kg.

The tyre of the invention may be used as a summer or winter or "all-season" (tyres usable in all seasons) tyre.

DESCRIPTION OF A TYRE ACCORDING TO THE INVENTION

Further features and advantages of the self-supporting tyre according to the invention will become apparent from the following description of a preferred embodiment thereof, given below by way of non-limiting example, to be read with reference to the attached FIG. 1, which is not to scale.

FIG. 1 is a radial sectional view of a preferred embodiment of a self-supporting tyre according to the present invention.

In FIG. 1, reference numeral (100) indicates a self-supporting tyre for vehicle wheels according to a preferred embodiment of the invention. The letters A and B indicate the side A and B of the tyre, respectively.

In the embodiment shown in FIG. 1, the tyre (100) is of the type for motor vehicles.

In FIG. 1, "a" indicates an axial direction and "X" indicates a radial direction, in particular X-X indicates the outline of the equatorial plane. For simplicity, FIG. 1 shows only a portion of the tyre, the remaining portion not shown being identical and arranged symmetrically with respect to the equatorial plane "X-X".

The tyre (100) for four-wheeled vehicles comprises at least one carcass structure, comprising at least one carcass layer (101) having respectively opposite end flaps engaged with respective annular anchoring structures (102), referred to as bead cores, possibly associated to a bead filler (104).

The tyre area comprising the bead core (102) and the filler (104) forms a bead structure (103) intended for anchoring the tyre onto a corresponding mounting rim, not shown.

The carcass structure is usually of radial type, i.e. the reinforcing elements of the at least one carcass layer (101) lie on planes comprising the rotational axis of the tyre and substantially perpendicular to the equatorial plane of the tyre. Said reinforcing elements generally consist of textile cords. Each bead structure is associated to the carcass structure by folding back of the opposite lateral edges of the at least one carcass layer (101) around the annular anchoring structure (102) so as to form the so-called carcass flaps (101*a*) as shown in FIG. 1.

In one embodiment, the coupling between the carcass structure and the bead structure may be provided by a second carcass layer (not shown in FIG. 1) applied in an axially external position to the first carcass layer.

An anti-abrasive strip (105) possibly made with elastomeric material is arranged in an outer position of each bead structure (103).

The carcass structure is associated to a belt structure (106) comprising one or more belt layers (106*a*), (106*b*) placed in radial superposition with respect to one another and with respect to the carcass layer, having typically textile and/or metallic reinforcing cords incorporated within a layer of elastomeric material.

Such reinforcing cords may have crossed orientation with respect to a direction of circumferential development of the tyre (100). By "circumferential" direction it is meant a direction generally facing in the direction of rotation of the tyre.

At least one zero-degree reinforcing layer (106*c*), commonly known as a "0° belt", may be applied in a radially outermost position to the belt layers (106*a*), (106*b*), which generally incorporates a plurality of elongated reinforcing elements, typically metallic or textile cords, oriented in a substantially circumferential direction, thus forming an angle of a few degrees (such as an angle of between about 0° and 6°) with a direction parallel to the equatorial plane of the tyre, and coated with an elastomeric material.

The tyre (100) may also comprise a further belt layer (not shown) disposed between the carcass structure (101) and the radially innermost belt layer of the aforementioned belt layers (106*a*), (106*b*) and comprising a plurality of reinforcing cords having an inclined orientation with respect to the circumferential direction of the tyre (100), or to the equatorial plane X-X of the tyre (100), by an angle equal to 90°.

A tread band (109) is applied in a radially external position to the belt structure (106). Moreover, respective sidewalls (108) of elastomeric material are applied in an axially outer position on the lateral surfaces of the carcass structure, each extending from one of the lateral edges of tread (109) at the respective bead structure (103).

A rubber layer (112), generally known as a "liner", which provides the necessary inflation air-impermeability to the tyre, may be present in a position radially internal to the carcass layer (101). A layer of elastomeric material, underliner (112*a*), may also be provided in a radially external position to said liner (112), according to a preferred embodiment of the invention.

The underliner (112*a*) may consist of a vulcanised elastomeric compound (B) having a shear modulus value G' of less than 1.25 MPa, said modulus G' being measured at 70° C., 10 Hz, 9% strain according to the method disclosed in the present description.

The sidewalls (108) of the tyre (100) also comprise a pair of respective sidewall reinforcing inserts (113A) and (113B).

The sidewall reinforcing inserts (113) are incorporated in the sidewall structures (108) in a position axially external to the underliner (112*a*) and axially internal to the carcass layer (101).

In the embodiment illustrated in FIG. 1, the sidewall reinforcing inserts of the tyre (113A) and (113B) have the same maximum axial extension Li measured in a direction perpendicular to the plane Ti tangent to the outer surface of the respective sidewall reinforcing insert (113).

The sidewall reinforcing insert of the tyre (113B) consists of a vulcanised elastomeric compound (B) having a shear modulus value G' of less than 1.25 MPa while the sidewall reinforcing insert of the tyre (113A) consists of a vulcanised elastomeric compound (A) having a shear modulus value G' of at least 1.25 MPa, said modulus G' being measured at 70° C., 10 Hz, 9% strain according to the method disclosed in the present description.

In a radially outer position, the tread band (109) has a rolling surface (109*a*) intended to come in contact with the ground. Circumferential grooves, which are connected by transverse notches (not shown in FIG. 1) so as to define a plurality of blocks of various shapes and sizes distributed over the rolling surface (109*a*), are generally made on this surface (109*a*), which for simplicity is represented smooth in FIG. 1.

A strip consisting of elastomeric material (110), commonly known as "mini-sidewall", may optionally be provided in the connecting zone between the sidewalls (108) and the tread band (109), this mini-sidewall being generally obtained by co-extrusion with the tread band (109) and allowing an improvement of the mechanical interaction between the tread band (109) and the sidewalls (108).

The rigidity of the tyre sidewall (108) may be improved by providing the bead structure (103) with a reinforcing layer (120) generally known as flipper or additional strip-like insert.

The flipper (120) is a reinforcing layer which is wound around the respective bead core (102) and the bead filler (104) so as to at least partially surround them, said reinforcing layer being arranged between the at least one carcass layer (101) and the bead structure (103). Usually, the flipper is in contact with said at least one carcass layer (101) and said bead structure (103).

The flipper (120) typically comprises a plurality of textile cords incorporated within a layer of elastomeric material.

The reinforcing annular structure or bead (103) of the tyre may comprise a further protective layer which is generally known by the term of "chafer" (121) or protective strip and which has the function of increasing the rigidity and integrity of the bead structure (103).

The chafer (121) usually comprises a plurality of cords incorporated within a rubber layer of elastomeric material. Such cords are generally made of textile materials or metallic materials.

A layer or sheet of elastomeric material may be arranged between the belt structure and the carcass structure (not shown).

The building of the tyre (100) as described above, may be carried out by assembling respective semi-finished products adapted to form the components of the tyre, on a forming drum, not shown, by at least one assembling device.

At least a part of the components intended to form the carcass structure of the tyre may be built and/or assembled on the forming drum. More specifically, the forming drum is suitable for receiving the liner first, followed by the underliner and the sidewall reinforcing inserts and subsequently the carcass structure. Thereafter, devices non shown coaxially engage one of the annular anchoring structures around each of the end flaps, position an outer sleeve comprising the belt structure and the tread band in a coaxially centred position around the cylindrical carcass sleeve and shape the carcass sleeve according to a toroidal configuration through a radial expansion of the carcass structure, so as to cause the application thereof against a radially inner surface of the outer sleeve.

After building of green tyre, a moulding and vulcanisation treatment is generally carried out in order to determine the structural stabilisation of the tyre through cross-linking of the elastomeric compositions, as well as to impart a desired tread pattern on the tread band and to impart any distinguishing graphic signs at sidewalls.

The following examples are now provided for merely illustrative and non-limiting purposes.

EXAMPLES

Evaluation Methods

The static mechanical properties (CA1 load at 100% elongation, CR tensile strength, AR % elongation at break) according to the UNI 6065:2001 standard were measured at 23° C. on samples of elastomeric materials, vulcanised at 170° C. for 10 minutes.

The compressive dynamic mechanical properties E' and Tan delta were measured using an Instron model 1341 dynamic device in the tension-compression mode as described herein. A test piece of cross-linked material (170° C. for 10 minutes) having a cylindrical shape (length=25 mm; diameter=14 mm), preloaded in compression up to a longitudinal strain of 25% with respect to the initial length and maintained at the predetermined temperature of 23° C. for the whole duration of the test was subjected to a dynamic sinusoidal stress having an amplitude of ±3.5% with respect to the length under pre-load, with a frequency of 10 Hz. The dynamic mechanical properties are expressed in terms of dynamic elastic modulus (E') and Tan delta (loss factor). The Tan delta value was calculated as the ratio between the viscous dynamic module (E") and the dynamic elastic modulus (E').

The dynamic mechanical properties of shear dynamic modulus G' and Tan delta were evaluated using an Alpha Technologies R.P.A. 2000 oscillating chamber rheometer (Rubber Process Analyser) with chamber geometry as described in ASTM D6601-19 FIG. 1, applying the following method:

1) an approximately cylindrical test sample with a volume in the range from 4.6 to 5 cm³ was obtained by punching a sheet with a thickness of at least 5 mm of the green vulcanisable elastomeric composition to be characterised;

2) the chambers of the RPA apparatus were preliminarily preheated to 170° C.;

3) the sample was loaded between the chambers of the RPA apparatus and the chambers were closed. Between the sample of the green vulcanisable elastomeric composition and each chamber of the RPA apparatus, two films were interposed to protect the chamber itself: in contact with the compound, a film of Nylon 6.6 cast of about 25 microns and in contact with the chamber of the RPA apparatus a polyester film of about 23 microns;

4) the sample was then vulcanised for a fixed time of 10 min at a temperature of 170° C. while recording the vulcanisation curve, i.e. subjecting the sample to a sinusoidal strain of 7% amplitude and 1.67 Hz frequency for the entire duration of the vulcanisation;

5) the temperature of the chambers of the RPA apparatus was then brought to 70° C.; 10 minutes after the chamber temperature was set at 70° C., a sequence of dynamic measurements was performed at a constant temperature of 70° C. by sinusoidally stressing the sample in torsion at a fixed frequency of 10 Hz and amplitude progressively increasing from 0.3% to 10%, carrying out 10 stabilisation cycles and 10 measurement cycles for each condition;

6) always at 70° C., a dynamic measurement was then performed by sinusoidally stressing the sample in torsion at the fixed frequency of 10 Hz and amplitude of 9%, carrying out 10 stabilisation cycles and 20 measurement cycles: the result was expressed as average of what measured in the 20 measurement cycles, as dynamic shear modulus G' and as Tan Delta (ratio between viscous modulus G" and G', Tan Delta=G"/G').

Rolling Resistance (RR) Assessment

Rolling resistance (RR) measurements were carried out on the sample tyres thus produced according to the UNECE reg. 117 Rev.4 annex 6-ISO 28580:2018 (par. 4b (torque method))—Notification No. 2011-237 (Korea). The rolling resistance coefficient was expressed in N/kN.

The tyres thus tested were then assigned a relative rolling resistance index equal to the ratio of the rolling resistance measured for the tyre in question with respect to the reference tyre. The lower the value of this index, the lower the rolling resistance of the tyre under test and therefore the better its performance.

The results of the tests carried out are reported in Tables 3 and 4. In these Tables, a reduction of the value (e.g. from 100 to 92) in the rolling resistance results represented improved performance while an increase of the value (e.g. from 100 to 104) indicated deterioration.

Evaluation of the Distance Travelled in Deflation Conditions (Run Flat Test)

A BMW 5 Series car was equipped with four tyres, reference, comparison or invention, depending on the tyre group under consideration (see below Example 2, PN1-PN5).

A flat ride test was performed for each group of tyres by completely deflating the left rear tyre and driving on a mixed route at a travel speed not exceeding 80 km/h until the tyre was evidently damaged. The test was however stopped after 120 km, when no damage occurred.

The test was repeated twice for each tyre group and the results averaged.

In order to compare the performance of the tyres, an "RF" distance index of 100 was assigned to a reference tyre for each group of tyres being compared.

A relative "RF" index was then assigned to the other tyres of the same group, corresponding to the ratio between the distance in flat running conditions measured for the test tyres compared to that of the reference tyre, set at 100, said distances having been measured in close comparison.

The results are shown in Tables 3 and 4.

In these Tables, maintaining or moderately decreasing the value (e.g. from 100 to 75) in flat driving results represented comparable or entirely acceptable performance even if slightly worsened. An increase in the value (e.g. from 100 to 120) indicated an improved performance, i.e. a longer distance while a significant decrease in the value (e.g. less than 65) indicated an unacceptable performance.

Example 1: Preparation of Elastomeric Compounds

The compositions described in the following Table 1 were prepared as elastomeric compositions for the sidewall reinforcing inserts and for underliners:

TABLE 1

| elastomeric compositions (phr) | | | | |
|---|---|---|---|---|
| Compositions | C1 | C2 | C3 | C4 |
| NR | — | 80 | 80 | — |
| IR | 40 | 20 | 20 | 90 |
| BR | 60 | — | — | — |
| SBR | — | — | — | 10 |
| CB | 32.0 | — | — | 52.0 |
| SilSep1 | — | — | 16.0 | — |
| SilSep3 | — | 15.0 | — | — |
| SilSep2 | 20.0 | — | — | — |
| Silica | — | 18.0 | — | 5.0 |
| Stearic acid | 2.0 | 2.0 | 2.0 | 1.0 |
| Zinc oxide | 4.0 | 3.6 | 4.0 | 3.0 |
| TESPT 50% on CB | 5.0 | 6.0 | 4.0 | — |
| TMQ | 1.0 | 1.0 | 1.0 | — |
| 6-PPD | 2.0 | 2.0 | 2.0 | 1.5 |
| TBBS | 2.5 | 1.9 | 1.9 | 3.0 |
| Isobutyl TUADS | 0.5 | — | 0.3 | — |
| Insoluble sulphur 67% | 2.3 | 3.6 | 3.6 | 3.4 |
| Total Phr | 171.3 | 153.1 | 134.8 | 168.9 |
| Total filler (%) | 32% | 24% | 13% | 34% | wherein IR: synthetic polyisoprene (SKI-3 Nizhnekamskneftekhim); NR natural rubber (Standard Thai Rubber STR 20-Thaiteck Rubber); BR: polybutadiene (Europrene Neocis ®-Polymers Europe); SBR: 1500 Europrene 1500 from Versalis; CB: carbon black N550 Birla Carbon; Silica: ZEOSIL 1115 HP (Solvay); SilSep1: white filler in M2 microbeads prepared according to Example 1 of patent application WO2019106562A1; SilSep2: white filler in M6 microbeads prepared according to Example 3 of patent application WO2019106562A1; Stearic acid: STEARINA N (SOGIS); Zinc oxide: Rhenogran ® ZnO-80 (RheinChemie); TESPT: Mixture of Bis(triethoxysilylpropyl)tetrasulphide (TESPT 50%) supported on carbon black (50%), produced by Evonik Industries AG, Germany; TMQ (anti-ageing): Polymerised NAUGARD Q (CHEMTURA CORPORATION); 6-PPD (antioxidant): N-(1,3-dimethylbutyl)-N'-phenyl-p-phenylene-diamine (SantoflexTM 6PPD-Eastman); TBBS (accelerant): N-tert-butyl-2-benzothiazylsulphenamide (Vulkacit ® NZ/EGC-Lanxess); Isobutil TUADS (Isobutylthiuram disulphide) accelerant produced by RTVanderbilt; Sulphur (vulcaniser): Insoluble Sulphur 67% oleate (Solfotecnica).

Starting from the elastomeric compositions shown in Table 1, the corresponding elastomeric compounds were prepared according to the following process.

In the first step (1), all the ingredients were introduced with the exception of vulcanisers and accelerants. The mixing was continued for a maximum time of 5 minutes, reaching a temperature of approximately 145° C. Subsequently, in the second test (2), again carried out using an internal mixer, the vulcanisers and accelerants were added, and the mixing was continued for about 4 minutes while maintaining the temperature below 100° C. The compounds were then unloaded. After cooling and at least 12 hours from preparation, some samples of the compounds were vulcanised in a press at 170° C. for 10 min to give the specimens useful for mechanical characterisations.

Characterisation of the Compounds

The main static and dynamic properties of the aforementioned elastomeric compounds, measured by the methods described above, are shown in the following Table 2:

TABLE 2

| Property | C1 | C2 | C3 | C4 |
|---|---|---|---|---|
| E' 23° C. 10 Hz | 9.32 | 4.32 | 4.68 | 5.19 |
| Tg D 23° C. 10 Hz | 0.072 | 0.053 | 0.036 | 0.097 |
| G'70° C. 10 Hz (RPA) | 1.81 | 0.82 | 0.74 | 1.45 |
| Tg D 70° C. 10 Hz (RPA) | 0.090 | 0.062 | 0.049 | 0.098 |

TABLE 2-continued

| Property | C1 | C2 | C3 | C4 |
|---|---|---|---|---|
| CA1 (MPa) | 5.14 | 2.33 | 3.39 | 3.47 |
| CR (MPa) | 12.3 | 19.62 | 8.26 | 14.5 |
| AR % | 244 | 487 | 275 | 300 |

Example 2: Production of Self-Supporting Tyres

To evaluate the performances of self-supporting tyres, in terms of rolling resistance and maximum mileage in conditions of deflation, with sidewall reinforcing inserts of different stiffness, according to the present invention, compared to reference and comparative tyres, with reinforcing inserts of equal stiffness, sets of eight tyres were prepared for each of the tyres PN1-PN5, having the features shown in Tables 3 and 4.

Each type of tyre included two sidewall reinforcing inserts, axially external to the layer of air-impermeable elastomeric material (liner) and axially internal to each of the sidewalls. The sidewall reinforcing inserts could differ in the composition of the compound, while they had the same thickness (Li—B equal to Li-A), as well as the same shape, as summarised below in Table 3. In vehicle tests, the asymmetrical self-supporting tyres were fitted so as to have the lower module sidewall reinforcing insert (insert B) facing inward. The set of tyres PN1-PN5 were then compared under the same operating conditions.

Preparation of Sample Tyres PN1-PN5

The Applicant produced samples of self-supporting tyres with dimensions 245/45 R18 100 Y XL, with butyl rubber liner extending only at the tread band and underliner extending from bead to bead, configured as follows:

PN1: reference self-supporting pneumatic tyre comprising a sidewall reinforcing insert of side A and a sidewall reinforcing inserts of side B, both consisting of the composition C1, identical in shape and size, with a maximum thickness (Li) 7 mm and with a maximum thickness of the underliner of 0.9 mm consisting of composition C4;

PN2: comparative self-supporting pneumatic tyre comprising a sidewall reinforcing insert of side A and a sidewall reinforcing inserts of side B, both consisting of composition C2, identical to the previous ones in shape and size, and with underliner consisting of composition C4;

PN3: comparative self-supporting tyre comprising sidewall reinforcing inserts identical to the previous ones in shape and size but where the sidewall reinforcing insert of side A consisted of the composition C1 and the sidewall reinforcing insert of side B of the composition C2 and with underliner consisting of composition C4;

PN4: self-supporting tyre of the invention comprising sidewall reinforcing inserts equal to the previous ones in shape but with maximum thickness Li increased by 14% and consisting, respectively, the sidewall reinforcing insert of side A of composition C1 and the sidewall reinforcing insert of side B of composition C3 and with underliner consisting of composition C4;

PN5: self-supporting tyre of the invention comprising sidewall reinforcing inserts equal to the previous ones in shape but with maximum thickness Li increased by 14%, consisting respectively the sidewall reinforcing insert of side A of composition C1 and the sidewall reinforcing insert of side B of composition C3 and with underliner consisting of composition C3.

All the aforementioned tyres were prepared by assembling the green components, and subsequent forming and vulcanisation.

The main features of the self-supporting tyres PN1-PN5, their relative performance of rolling resistance and maximum mileage in deflation conditions, evaluated according to the methods described above, are shown in the following Table 3:

TABLE 3

| Tyre | PN1 | PN2 | PN3 | PN4 | PN5 |
|---|---|---|---|---|---|
| Insert A composition (external side) | C1 | C2 | C1 | C1 | C1 |
| Insert B composition (internal side) | C1 | C2 | C2 | C3 | C3 |
| Relative thickness of inserts | 100 | 100 | 100 | 114 | 114 |
| Underliner composition | C4 | C4 | C4 | C4 | C3 |
| Relative RR | 100 | 93 | 92 | 95 | 95 |
| Relative RF | 100 | 17 | 36 | 119 | 203 | wherein the insert B had the same thickness as the insert A; the relative thickness of the inserts represented the thickness of the inserts Li re-measured by setting the thickness of the inserts of the tyre PN1 to be 100; RR represented the relative rolling resistance re-parameterised by setting the rolling resistance of the tyre PN1 to be 100; RF (run flat) represented the maximum mileage in conditions of deflation/flat running, relative re-parameterised by setting the flat running of tyre PN1 to 100.

Table 3 shows the effects in self-supporting tyres of replacing a conventional rigid elastomeric compound (C1) with a softer compound (C2, C3), as a constituent of the sidewall reinforcing insert of the inner side B, of substitution of a conventional rigid elastomeric compound (C4) with a softer compound (C3), as a constituent of the underliner and of the variation in the thickness of the sidewall reinforcing inserts, on the performance of interest.

In particular, by comparing the compositions C1 with C2 and C3 (Tables 1 and 2), it was observed that by changing the elastomeric composition (for example by replacing the polybutadiene with natural rubber and polyisoprene), by modifying and reducing the filler (from 32% to 25% and 15%) and by modulating the vulcanisation system, the rigidity was greatly reduced in terms of both the dynamic compression/elongation modulus E', and of the dynamic shear modulus G' and hysteresis (see E' at 23° C., G', Tan D at 70° C. in Table 2).

Similarly, comparing the soft compound C3 with the conventional compound of underliner C4 (Tables 1 and 2) it was observed that by modifying and reducing the filler (from 34% to 15%) and by modulating the vulcanisation system, there was a marked decrease in rigidity, especially in terms of dynamic shear modulus G', and a reduced hysteresis (see G', Tan D at 70° C. in Table 2).

Considering the corresponding tyre data, in Table 3 it was observed that using the same soft compound C2 for both inserts (PN2 vs PN1) there was, for the same shape and size, an interesting noticeable decrease in rolling resistance accompanied, however, by a clear worsening in the flat running distance, which fell from 100 to 17.

Using the soft compound C2 only for the side B insert (PN3 vs PN1)—placed on the most stressed internal side—with the same shape and size of the inserts, surprisingly, a partial but not sufficient recovery of the flat running distance was observed, which rose from 17 to 36, with the same noticeable decrease in rolling resistance.

By using the soft compound C3 only for the insert on side B (PN4 vs PN1)—placed on the most stressed internal side—and with a limited increase in the thickness of both sidewall reinforcing inserts of 14%, with the same shape, an increase in the flat driving distance from 100 to 119 was surprisingly observed, associated in any case with a good reduction in rolling resistance from 100 to 95.

Finally, in the best embodiment PN5, if in the tyre PN4, all other conditions being equal, the conventional rigid elastomeric composition of the underliner C4 was replaced with the softer one C3 (PN5 vs PN4), surprisingly, a further significant increase in the flat running distance was observed (119 to 203) associated with the same significant reduction in rolling resistance (95).

In the following Table 4, PN5 vs PN4 were directly compared:

TABLE 4

| Tyre | PN4 | PN5 |
|---|---|---|
| Insert A composition (external side) | C1 | C1 |
| Insert B composition (internal side) | C3 | C3 |
| Underliner composition | C4 | C3 |
| Relative RR | 100 | 100 |
| Relative RF | 100 | 171 | setting the rolling resistance an at running distance of the tyre PN4 to be 10.

Table 4 showed more clearly the unexpected effect of the underliner composition in further improving the run-flat driving performance, while still maintaining the excellent rolling resistance. With this embodiment (self-supporting tyre PN5) the end of the test was reached in run-flat condition without visible damage to the tyre.

In conclusion, from the above tests it was found that by reducing the stiffness of the sidewall reinforcing insert of the most stressed side of self-supporting tyres, preferably also the stiffness of the underliner, and with a limited increase in the thickness of the inserts, it was possible to achieve a very advantageous result in the overall performance of the tyre, as it is significantly improved in terms of mileage in flat running conditions but above all in rolling resistance and comfort compared to prior art self-supporting tyres, characterised by asymmetrical, more rigid inserts placed on the most stressed side and/or with high volumes.

The invention claimed is:

1. A self-supporting tyre for automotive wheels comprising:

a carcass structure comprising at least one carcass layer having opposite lateral edges associated with respective annular anchoring structures;

a belt structure applied in a position radially external to the carcass structure;

a tread band applied in a position radially external to the belt structure;

a pair of sidewall structures each including a sidewall extended in a position axially external to the carcass structure and extended radially between one of the annular anchoring structures and an axially external portion of the tread band;

a single first and a single second sidewall reinforcing insert, wherein the first and second inserts are each inside the respective sidewall structure of the tyre, at a position axially internal to the respective sidewall, and wherein the first sidewall reinforcing insert consists of an elastomeric compound (A) having a shear modulus value G' of at least 1.25 MPa, the second sidewall reinforcing insert consists of an elastomeric compound (B) having a shear modulus value G' of less than 1.25 MPa, wherein the moduli G' is measured at 70° C., 10 Hz, 9% strain, a liner comprising a layer of air-impermeable elastomeric material located at the most radially internal position of the tyre and extending at least at the tread band, and an underliner comprising a layer of elastomeric material, located at a position radially external to the liner, radially internal to the carcass structure, axially internal to the sidewall reinforcing inserts, and wherein the elastomeric compound (A) comprises at least one reinforcing filler composition, the elastomeric compound (B) comprises at least one reinforcing filler composition, and the amount of the at least one reinforcing filler with respect to the total weight of elastomeric composition (A) is greater than the amount of the at least one reinforcing filler with respect to the total weight of elastomeric composition (B), and the underliner comprises the elastomeric compound (B) having the value of shear modulus G' of less than 1.25 MPa, said modulus G' being measured at 70° C. 10 Hz, 9% strain according to the Rubber Process Analyzer (RPA) method.

2. The tyre according to claim 1, wherein the elastomeric compound (B) is from a vulcanizable elastomeric composition (B) comprising:

100 phr of at least one diene elastomeric polymer, a total amount of less than 30% by weight of the total weight of the vulcanizable elastomeric composition (B) of the at least one reinforcing filler composition, and at least 0.1 phr of at least one vulcanising agent.

3. The tyre according to claim 2, wherein the elastomeric compound (B) has a shear modulus value G' of less than 1.20 MPa, wherein the modulus is measured at 70° C., 10 Hz, 9% strain according to the Rubber Process Analyzer (RPA) method.

4. The tyre according to claim 3, wherein said elastomeric compound (B) has a shear modulus value G' of less than 1.0 MPa, said modulus being measured at 70° C., 10 Hz, 9% strain according to the Rubber Process Analyzer (RPA) method.

5. The tyre according to claim 1, wherein the elastomeric compound (B) has a shear modulus value G' of less than 1.20 MPa, wherein the modulus is measured at 70° C., 10 Hz, 9% strain according to a Rubber Process Analyzer (RPA) method.

6. The tyre according to claim 5, wherein said elastomeric compound (B) has a shear modulus value G' of less than 1.0 MPa, said modulus being measured at 70° C., 10 Hz, 9% strain according to the Rubber Process Analyzer (RPA) method.

7. The tyre according to claim 1, wherein the elastomeric compound (B) has one or more properties:

a value of dynamic compression elastic modulus E' of less than 7.50 MPa, measured at 23° C., 10 Hz; and a value of Tan Delta not greater than 0.080, according to the Rubber Process Analyzer (RPA) method.

8. The tyre according to claim 1, wherein the elastomeric compound (B) is a vulcanizable elastomeric composition (B) comprising:

from 70 phr to 100 phr of a synthetic or natural polyisoprene or mixtures thereof, from 0 phr to 30 phr of a polybutadiene, and the at least one reinforcing filler in a total amount of less than 27%, by weight of the total weight of the elastomeric composition (B).

9. The tyre according to claim 8, wherein the at least one reinforcing filler is present in a total amount of less than 20% by weight of the total weight of the elastomeric composition (B).

10. The tyre according to claim 1, wherein the vulcanised elastomeric compound (A) has a shear modulus value G' of at least 1.30 MPa.

11. The tyre according to claim 10, wherein said vulcanised elastomeric compound (A) has a shear modulus value G' of at least 1.60 MPa.

12. The tyre according to claim 1, wherein the vulcanised elastomeric compound (A) has one or more properties:

a value of dynamic compression elastic modulus E' greater than 7.5 MPa, measured at 23° C., 10 Hz;

a value of Tan Delta greater than 0.040, measured at 70° C., 10 Hz according to a Rubber Process Analyzer (RPA).

13. The tyre according to claim 1, wherein the vulcanised elastomeric compound (A) is from a vulcanizable elastomeric composition comprising:

from 20 phr to 70 phr of a synthetic or natural polyisoprene or mixtures thereof, and from 30 phr to 80 phr of a polybutadiene, and the at least one reinforcing filler in a total amount of at least 25% by weight of the total weight of the elastomeric composition (A).

14. The tyre according to claim 1, wherein the first sidewall reinforcing insert and the second sidewall reinforcing insert have the same maximum axial extension L-i, measured in a direction perpendicular to the plane Ti tangent to the outer surface of the sidewall reinforcing insert, wherein a maximum axial extension L-i ranges from 3 mm to 14 mm.

15. The tyre according to claim 1, wherein the underliner consists of the elastomeric compound (B) having the value of shear modulus G' of less than 1.25 MPa, said modulus G' being measured at 70° C., 10 Hz, 9% strain according to the Rubber Process Analyzer (RPA) method.

16. The tyre according to claim 1, wherein the elastomeric compound (B) further comprises a silane coupling agent and white filler, and wherein the silane coupling agent comprises an amount of at least 7% by weight with respect to the weight of the white filler.

17. The tyre according to claim 1, wherein the elastomeric compound (B) has a shear modulus value G' of less than 1.20 MPa and the elastomeric compound (A) has a shear modulus value G' of at least 1.30 MPa.

18. The tyre according to claim 1, wherein the tread band is applied in a position radially external to and in contact with the belt structure.

19. The tyre according to claim 1, wherein the elastomeric compound (B) is from a vulcanizable elastomeric composition (B) comprising polybutadiene in an amount of less than 20 phr.

* * * * *